(12) United States Patent
Okada et al.

(10) Patent No.: US 7,425,988 B2
(45) Date of Patent: Sep. 16, 2008

(54) IMAGE PICK-UP APPARATUS, IMAGE PROCESSING APPARATUS AND METHOD OF CORRECTING CHROMATIC ABERRATION OF LENS

(75) Inventors: Miyuki Okada, Kanagawa (JP); Satoshi Mitsui, Aichi (JP)

(73) Assignee: Sony Corporation (JP)

( * ) Notice: Subject to any disclaimer, the term of this patent is extended or adjusted under 35 U.S.C. 154(b) by 782 days.

(21) Appl. No.: 10/947,272

(22) Filed: Sep. 23, 2004

(65) Prior Publication Data

US 2005/0179788 A1    Aug. 18, 2005

(30) Foreign Application Priority Data

Oct. 7, 2003    (JP)    ............ P2003-348562

(51) Int. Cl.
H04N 5/228    (2006.01)
(52) U.S. Cl. .................................. 348/222.1
(58) Field of Classification Search ............... 348/222.1
See application file for complete search history.

(56) References Cited

U.S. PATENT DOCUMENTS

| | | | |
|---|---|---|---|
| 6,097,430 A | 8/2000 | Komiya et al. | |
| 6,219,446 B1 | 4/2001 | Kiriki et al. | |
| 6,683,652 B1 * | 1/2004 | Ohkawara et al. | ........... 348/347 |
| 7,030,911 B1 * | 4/2006 | Kubo | ..................... 348/221.1 |
| 2002/0168115 A1 * | 11/2002 | Sumitomo et al. | .......... 382/254 |

FOREIGN PATENT DOCUMENTS

| | | |
|---|---|---|
| EP | 0410419 | 1/1991 |
| JP | 61-089791 | 5/1986 |
| JP | 02-023790 | 1/1990 |
| JP | 03-151784 | 6/1991 |
| JP | 05-003568 | 1/1993 |
| JP | 08-289191 | 11/1996 |

(Continued)

OTHER PUBLICATIONS

Japanese Office Action issued in corresponding application No. 2003-348562 dated Jul. 10, 2007.

(Continued)

Primary Examiner—Lin Ye
Assistant Examiner—James M. Hannett
(74) Attorney, Agent, or Firm—Rader Fishman & Gauer; Ronald P. Kananen

(57) ABSTRACT

Through an image pick-up lens 1, image light is focused on an image pickup surface of an image pickup unit 2 for which a primary color filter is provided. An electrical signal removed from the image pickup unit 2 is supplied to an A/D conversion circuit 3 to be converted into raw data of each primary color and is supplied to a first camera signal processing circuit 61 without any change. In the first camera signal processing circuit 61, only basic video signal processing such as gamma-correction is performed. Then, the raw data of each primary color processed in the first camera signal processing circuit 61 is stored in a picture memory 4. The raw data of each primary color stored in the picture memory 4 is supplied to a magnification-reduction circuit 94 functioning as a first resolution conversion processing circuit for correcting the chromatic aberration of a lens.

27 Claims, 15 Drawing Sheets

FOREIGN PATENT DOCUMENTS

| | | |
|---|---|---|
| JP | 9-027943 | 1/1997 |
| JP | 11-161733 | 6/1999 |
| JP | 11-161773 | 6/1999 |
| JP | 2000 115509 | 4/2000 |
| JP | 2002-199410 | 7/2002 |
| JP | 2003-255424 | 9/2003 |

OTHER PUBLICATIONS

European Search Report Nov. 8, 2007.

* cited by examiner

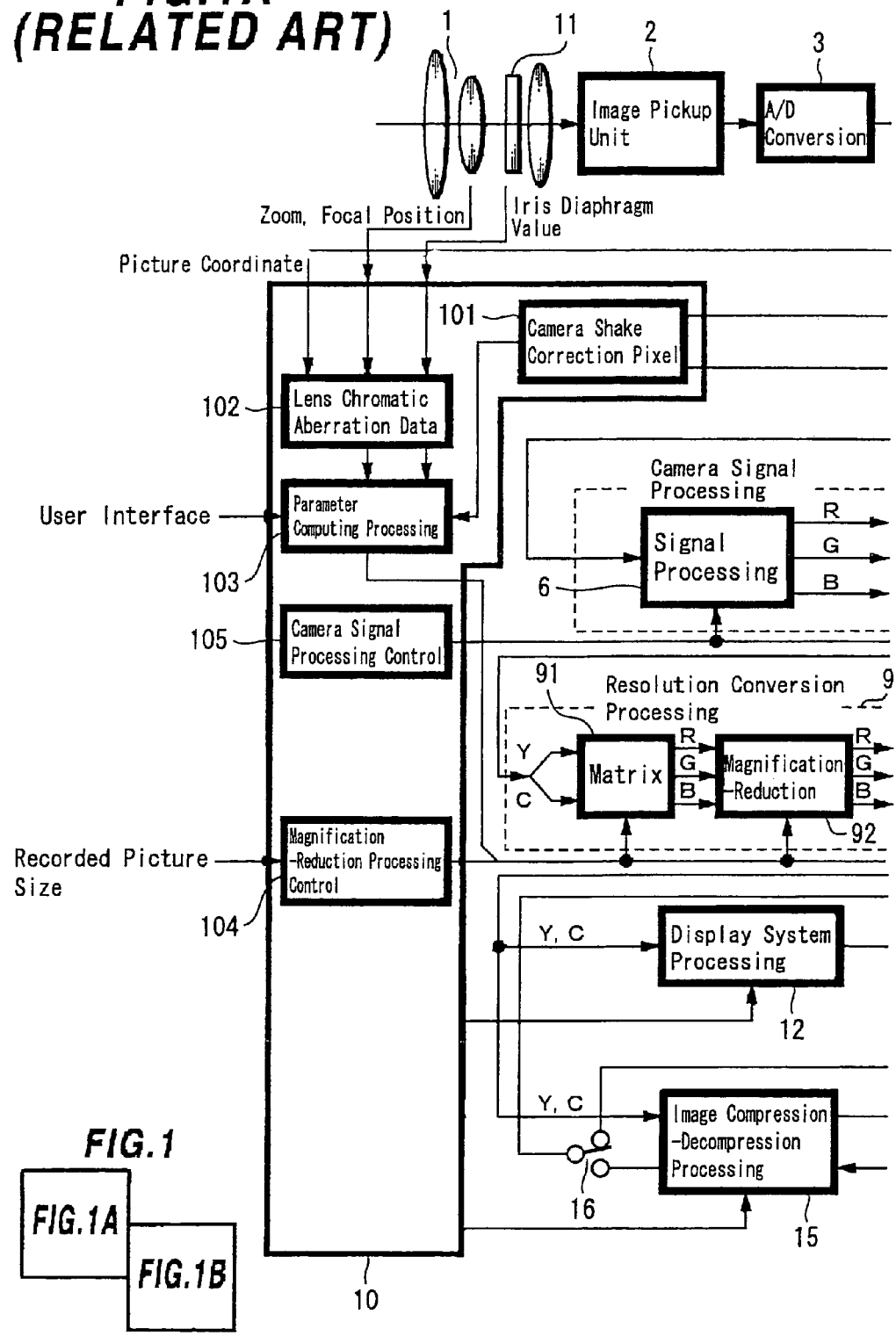

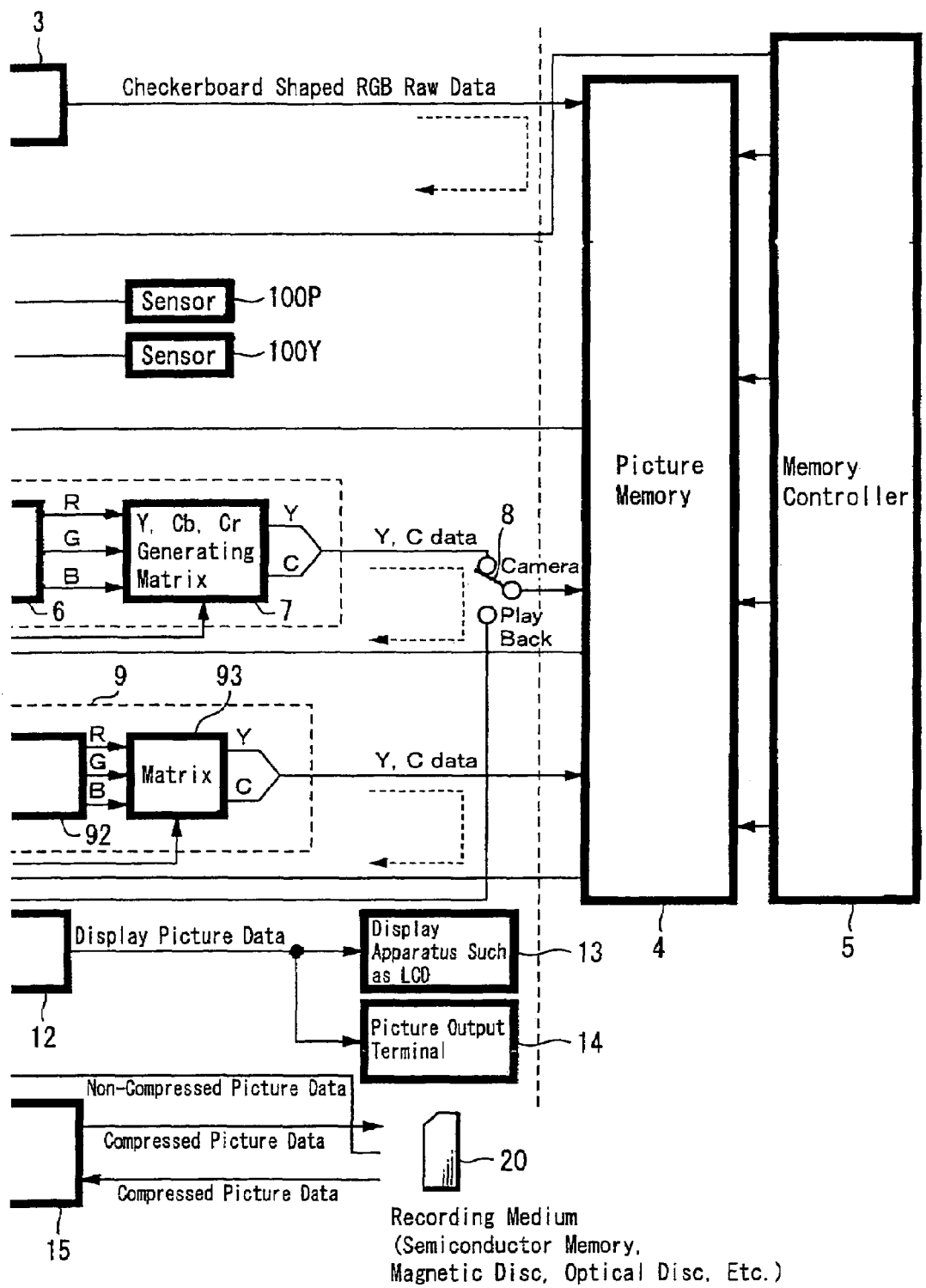

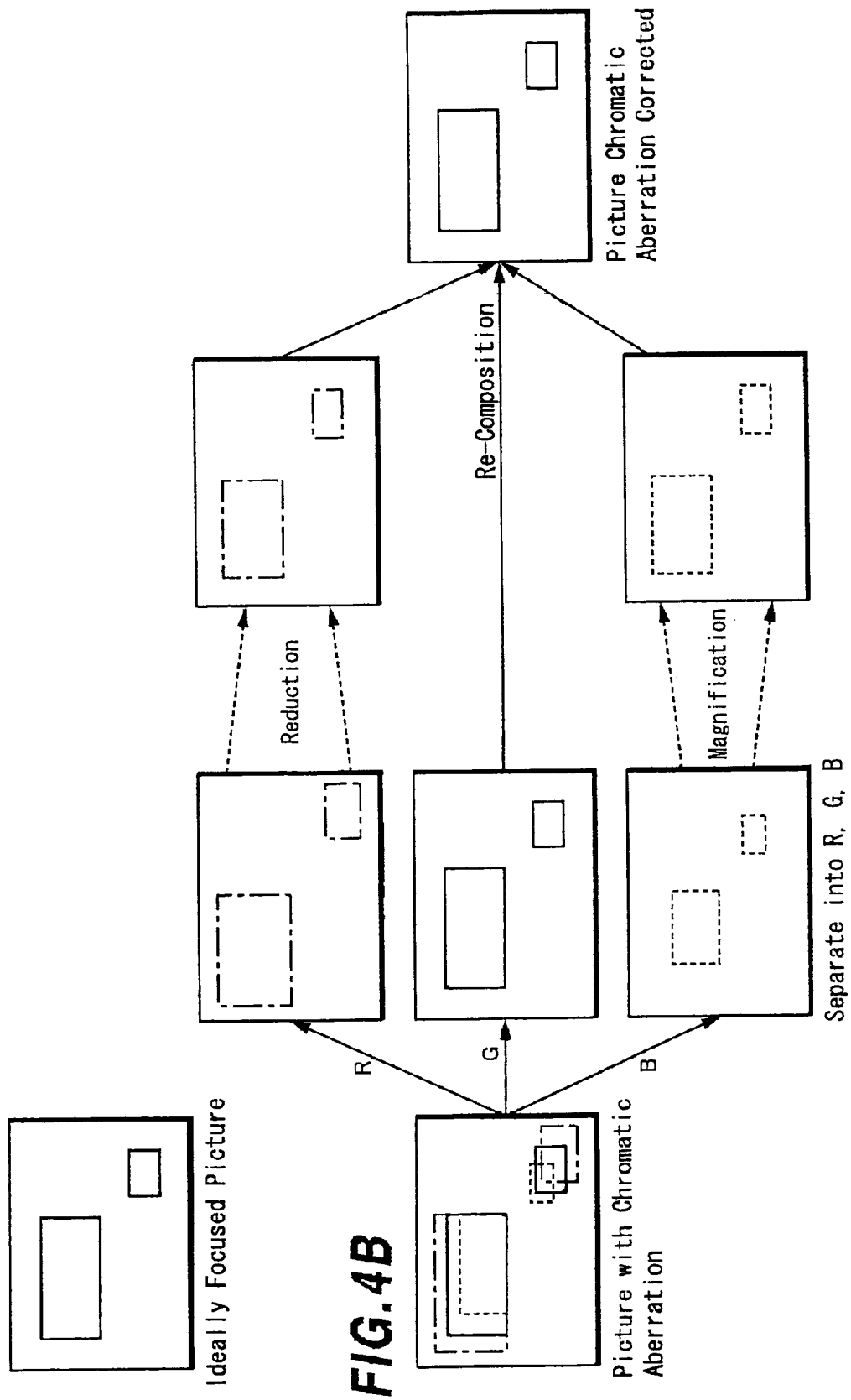

| A1 | G | R | G | R | G | R |
|---|---|---|---|---|---|---|
| A2 | Conv. Ratio for Green | Conv. Ratio for Red | Conv. Ratio for Green | Conv. Ratio for Red | Conv. Ratio for Green | Conv. Ratio for Red |

| B1 | B | G | B | G | B | G |
|---|---|---|---|---|---|---|
| B2 | Conv. Ratio for Blue | Conv. Ratio for Green | Conv. Ratio for Blue | Conv. Ratio for Green | Conv. Ratio for Blue | Conv. Ratio for Green |

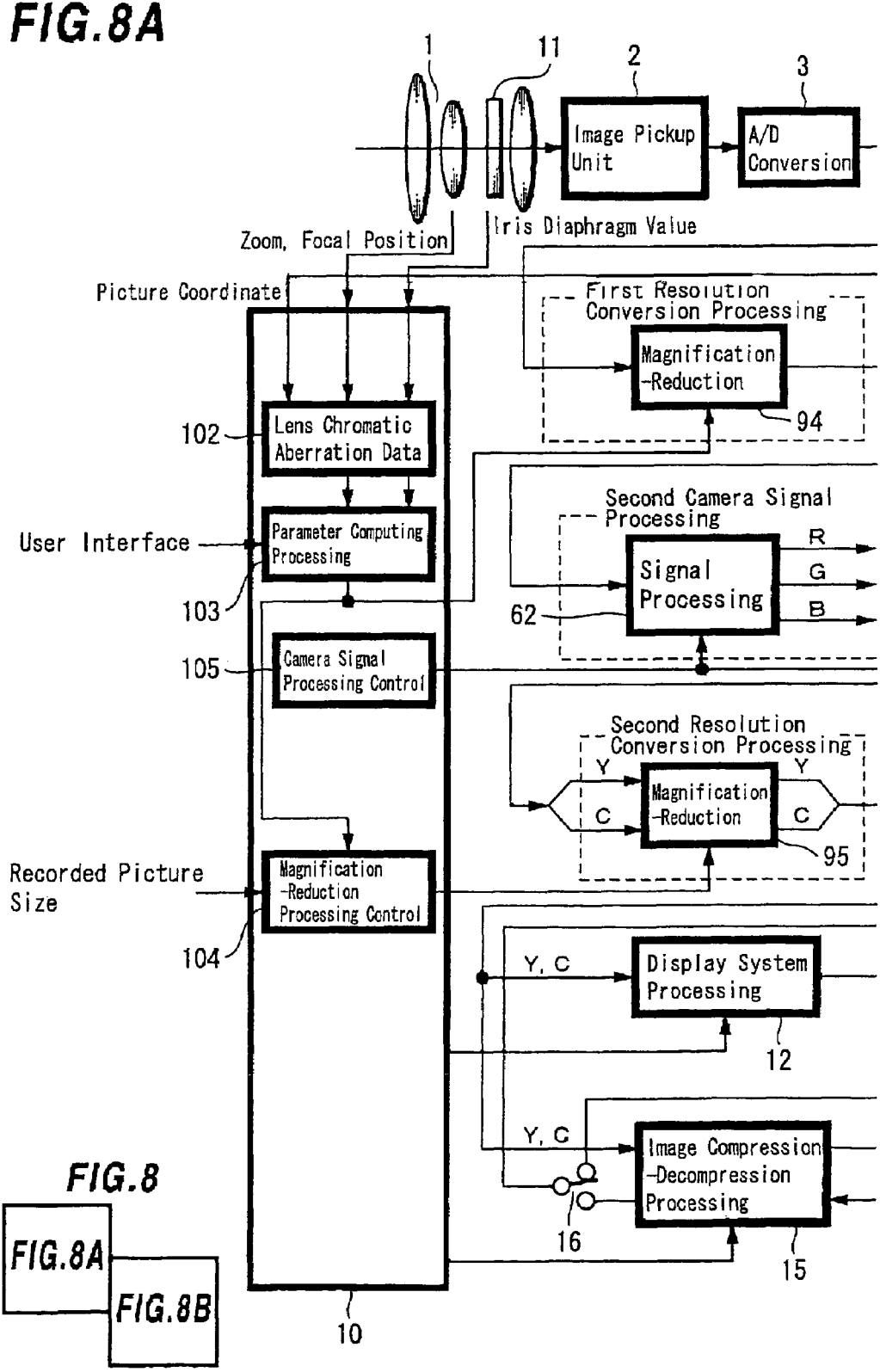
FIG.8A
FIG.8
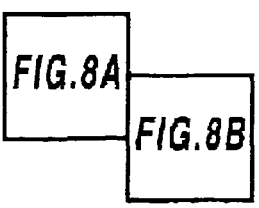

IMAGE PICK-UP APPARATUS, IMAGE PROCESSING APPARATUS AND METHOD OF CORRECTING CHROMATIC ABERRATION OF LENS

BACKGROUND OF THE INVENTION

1. Field of the Invention

The present invention relates to an image pick-up apparatus, an image processing apparatus and a method of correcting chromatic aberration of a lens, which are suitable for use in a video camera or a digital still camera, for example. Specifically, the present invention relates to satisfactorily correcting chromatic aberration of a lens which is caused when image light which passes through an image pick-up lens.

2. Description of the Related Art

For example, in an image pick-up apparatus to pick up a color picture using an image pickup unit including a plurality of image pickup devices or image pickup tubes, there have been proposed hitherto various methods of correcting a registration of pictures among a plurality of image pickup units using an electrically correcting unit (for example, refer to patent references 1 through 3).

However, each of the above described art relates to the image pick-up apparatus which uses a plurality of image pickup devices and image pickup tubes, and is different from an image pick-up apparatus to pick up a color picture by providing an optical color filter on an image pickup surface of, for example, one piece of image pickup device. Moreover, there is no description provided with respect to the correction of chromatic aberration of a lens in the image pick-up apparatus to pick up a color picture by providing the optical color filter on the image pickup surface of, for example, one piece of image pickup device.

On the other hand, as means to prevent a picture quality degradation such as color blurring and a resolution degradation caused by magnification chromatic aberration, there is known technology in which a video signal of each color of R, G and B taken out from a CCD (image pickup device) is temporarily stored in an individual field memory respectively; further each picture is magnified or reduced by individually performing a vector transfer of the whole of each field memory based on a drive state of an image pick-up lens such as a zoom focal length and a focal position; thereafter, R, G and B are again combined, and thereby, a color smear which is generated by an image pick-up lens of a video camera is corrected (for example, refer to a patent reference 4).

However, when the apparatus is used performing camera shake correction, for example, sufficient correction can not be performed. In other words, when the vector transfer is performed individually to the whole of each field memory in the above described apparatus, the center is made to coincide with a light axis of an image pick-up lens; however, when the camera shake correction is performed, a position of the light axis is moved and it becomes difficult to make the center coincide with the light axis.

[Patent reference 1] Japanese Patent No. 2552741
[Patent reference 2] Japanese Patent No. 2922905
[Patent reference 3] Japanese Published Examined Patent Application No. H6-5959
[Patent reference 4] Japanese Published Unexamined Patent Application No. H5-3568

For example, a miniaturization is rapidly advanced in a video camera or a digital still camera, and the miniaturization is also demanded with respect to an image pick-up lens. For this reason, regarding the miniaturization of the image pick-up lens, conventional one which uses a number of combined lenses is replaced with miniaturized one including one piece or a small number of lenses. Moreover, a lens having a smaller diameter replaces a lens having a larger diameter for the miniaturization. As an alternative, less expensive material of a lens is used for a price reduction.

However, in the case where such miniaturized image pick-up lens is used, it becomes difficult to sufficiently prevent the picture quality degradation such as so-called chromatic aberration generated in the lens. In other words, since a refractive index in a lens is different depending on each wavelength of red (R), green (G) and blue (B) which is separated by, for example, a spectroscopic filter in an optical lens, there occurs such a phenomenon that an image of red (R) is focused outside the image of green (G) and an image of blue (B) is focused inside the image of green (G), as shown in FIG. 5 for example. Therefore, even if a subject for image pick-up is formed of, for example, white and black only, there has been a problem in which color blurring (color smear) is generated in the edge of a picture.

Therefore, in order to prevent the picture quality degradation such as the color blurring and the resolution degradation caused by such magnification chromatic aberration (also, called as horizontal chromatic aberration), conventionally a large number of lenses are combined to perform the correction inside the image pick-up lens; however it has become difficult to fully prevent such picture quality degradation with the image pick-up lens which is miniaturized as described above. In order to deal with the above problem, such apparatus as is disclosed in the above mentioned patent reference 4 has been proposed as means which prevents the picture quality degradation such as the color blurring or the resolution degradation by the magnification chromatic aberration.

In other words, in the apparatus disclosed in the patent reference 4, the video signal of each color of R, G and B which is taken out from the CCD (image pick up device) is once converted into digital data; the data is stored temporarily in the individual field memory respectively; further each picture is magnified or reduced by performing individually the vector transfer on a pixel stored in each field memory based on the drive state of the image pick-up lens such as the zoom focal length and the focal position; and the color smear generated in the image pick-up lens of the video camera is corrected subsequently by combining R, G and B again.

On the other hand, when image pick-up is performed by holding, for example, the above mentioned compact video camera or digital still camera by hand, there is a possibility of causing a trouble such as picture shaking due to so-called camera shake. Accordingly, a so-called camera shake correction apparatus is equipped in the compact video camera or the digital still camera for the purpose of eliminating such troubles as the picture shaking. FIG. 6 shows a block diagram of a video camera or a digital still camera in which such camera shake correction apparatus is equipped.

In FIG. 6, image light from a subject (not shown) is focused on an image pickup surface of an image pickup unit 151 including a CCD, a CMOS sensor and the like through an image pick-up lens 150, and is converted into an electrical picture signal including, for example, an intensity signal (Y) and two color-difference (Cb, Cr) signals. This picture signal is supplied to a camera signal processing circuit 152, and signal processing such as so-called γ-correction is performed to form a conventional picture signal which is used for a general-purpose video apparatus.

Further, in order to detect a so-called camera shake, hereupon two gyroscopic sensors 153P and 153Y, for example, are used, and angular velocities generated by the camera shake in the pitch direction and in the yaw direction are detected. Further, a zoom focal length of the image pick-up lens 150 which is operated by, for example, a user is detected by the image pick-up lens 150. In addition, it is possible to use an operational signal from a manual operation input unit 154, for example, by the operation of the user to detect the zoom focal length.

Then, signals of the angular velocity detected by the gyroscopic sensors 153P and 153Y are supplied to high-pass filters (HPF) 155P and 155Y to remove a direct-current component, and also, the data of the above mentioned zoom focal length are supplied to a table 156 to obtain a necessary operation coefficient from the data, and this operation coefficient is supplied to multipliers 157P and 157Y to multiply signals from the high-pass filters 155P and 155Y by the operation coefficient. Furthermore, output signals from the multipliers 157P and 157Y are respectively supplied to integrators 158P and 158Y.

Accordingly, angle information on the image pick-up lens 150 which is fluctuated by the camera shake is taken out from the integrators 158P and 158Y. Then, this angle information of the camera shake is supplied, for example, to the image pickup unit 151 through limiter circuits 159P and 159Y, and a position where the picture signal is taken out from the image pickup unit 151 is controlled. In other words, a larger image pickup surface than a size of an original picture is provided, for example, in the image pickup unit 151, and a required picture is taken out from inside the image pickup surface so as to cancel out the fluctuation by the camera shake.

Thus, in the case where the compact video camera, digital still camera or the like is used, the so-called camera shake correction is performed. In addition, as means for performing the camera shake correction, such a method of storing all the picture signals picked up by the image pickup unit 151 in a memory 160 and of controlling a position to read out the picture signal from this memory 160, and a method of shifting and correcting a position of a part of lenses in the image pick-up lens 150 have also been performed other than the control of the position to take out the picture signal from the above mentioned image pickup unit 151.

Further, as means to take out the angle information of the image pick-up lens 150 which is fluctuated by the camera shake, other than the means which uses the above mentioned gyroscopic sensors 153P and 153Y, the picture signal from the image pickup unit 151 is made to be stored in a frame memory 161 as shown in FIG. 7 for example, and picture signals prior to and subsequent to this frame memory 161 are compared in a comparing circuit 162 so that the angle information on the camera shake can also be computed from a movement of a picture such as a background thereof. In addition, this computed angle information on the camera shake can be used in all of the above mentioned camera shake correction means.

However, when it is tried to perform the correction of the picture quality degradation such as the color blurring or the resolution degradation caused by the magnification chromatic aberration using the apparatus disclosed, for example, in the above described patent reference 4 while performing such camera shake correction, the sufficient correction can not be performed. In other words, when the vector transfer is performed individually to the whole of each field memory in the above described apparatus, the center thereof should coincide with the light axis of the image pick-up lens; however when the camera shake correction is performed, the position of the light axis is moved and it becomes difficult to make the center coincide.

Accordingly, conventionally the correction of the picture quality degradation caused by such as chromatic aberration is not performed concurrently with the correction of the camera shake. However, in case of a conventional model which has a small number of pixels, the picture quality degradation such as the chromatic aberration becomes less conspicuous particularly when an image is picked up with the camera shake correction. However, an increase in the number of image pick-up pixels has been demanded in recent years and as a result, an influence of the picture quality degradation such as the chromatic aberration has become noticeable in all situations.

This application is made in view of the above and the problem to be solved is that with a conventional means, the problem of the picture quality degradation such as the color blurring or the resolution degradation caused by the magnification chromatic aberration occurs due to a miniaturization of an image pick-up lens and the like; it becomes difficult to fully prevent such picture quality degradation only using the image pick-up lens; and further, there has not been proposed means to satisfactorily realize such correction in an image pick-up apparatus to pick up a color image by providing an optical color filter on an image pickup surface of, for example, one piece of image pickup device.

SUMMARY OF THE INVENTION

According to the present invention, a magnification or reduction of a picture is performed on each color with respect to a primary color signal from a camera signal processing unit which performs processing of a picture signal without any change performed on the primary color signal at a time of image pick-up, and an amount of an iris diaphragm and a lens image height of a subject in an image pick-up lens are detected to control a conversion factor and a coordinate of the center of light axis for performing the magnification or reduction of the picture, so that the picture quality degradation which occurs in the miniaturized image pick-up lens can be favorably corrected particularly in the image pick-up apparatus to perform the image pick-up of a color picture by providing an optical color filter on the image pickup surface of one piece of image pickup device.

According to an aspect of claim 1 of the present invention, the magnification or reduction of the picture is performed on each color with respect to a primary color signal from a camera signal processing unit which performs processing of the picture signal without any change from the primary color signal at the time of image pick-up, and also, the amount of the iris diaphragm and the lens image height of the subject in the image pick-up lens are detected to control the conversion factor and the coordinate of the center of light axis for performing the magnification or reduction of the picture, so that the picture quality degradation which occurs in the miniaturized image pick-up lens can be favorably corrected particularly in the image pick-up apparatus to perform the image pick-up of a color picture by providing an optical color filter on the image pickup surface of one piece of image pickup device.

Further, according to an aspect of claim 2 of the present invention, a display system processing unit configured to output a video signal from a second camera signal processing unit to a display apparatus or to an external output terminal, and/or a recording and reproducing unit configured to record a video signal from the second camera signal processing unit in a recording medium is included, so that a display and/or recording of a photographed picture can be performed easily.

According to an aspect of claim 3 of the present invention, an inverse conversion unit configured to inversely convert the video signal reproduced from the recording medium in the recording and reproducing unit into a primary color signal is provided and a signal from the inverse conversion unit is supplied to a first resolution conversion unit, so that the correction of the picture quality degradation can also be performed satisfactorily on the video signal recorded in the recording medium.

According to an aspect of claim 4 of the present invention, a second resolution conversion unit configured to perform a magnification or reduction of a picture of the whole screen with respect to the video signal from the second camera signal processing unit is further provided, so that the magnification and reduction processing of the corrected video signal can be performed easily.

According to an aspect of claim 5 of the present invention, the first and second resolution conversion units are made to be one unit used in common by providing a signal switching unit before and after the unit, so that the correction is performed satisfactorily with a smaller circuit configuration.

According to an aspect of claim 6 of the present invention, a difference between a coordinate of a detected pixel on a screen and the coordinate of the center of light axis is used to detect a lens image height of a subject, so that correction processing of a picture signal can satisfactorily be performed.

According to an aspect of claim 7 of the present invention, since an automatic focus adjusting unit capable of controlling a focusing position is included and a coordinate of a controlled focusing position is made to represent the detecting pixels of the whole screen to be used for detecting the lens image height of the subject, the chromatic aberration correction for a part where the focus is not adjusted can be simplified and a circuit scale, processing time, consumption power, control software, a memory for storing lens data and the like can be reduced greatly.

According to an aspect of claim 8 of the present invention, a drive state of the image pick-up lens and an amount of camera shake correction is further detected; and the conversion factor for performing the magnification or reduction is controlled in the resolution conversion unit and the coordinate of the center of light axis for performing the magnification or reduction is controlled in the resolution conversion unit in accordance with the above further detected output in addition to the detected output, so that further favorable correction processing of the picture signal can be performed.

According to an aspect of claim 9 of the present invention, since an input unit configured to manually input information corresponding to a drive state of the iris diaphragm and the lens image height of a subject is provided in relation to a control unit, a user can set a desired amount of correction and the desired correction can be performed while checking a reproduced picture on a monitor, for example.

According to an aspect of the present invention, a checkerboard shaped primary color filter including a color separating unit of arbitrary three colors or more is provided corresponding to each pixel in the image pickup unit; and a data memory unit in which chromatic aberration data specific to the image pick-up lens is stored for each color of the primary color filter and a computing unit which computes a control parameter to control the conversion factor and the coordinate of the center of light axis for performing the magnification or reduction in the control unit using the chromatic aberration data stored in the data memory unit and the detected output from the detection unit are included, so that the correction processing of the picture signal can satisfactorily be performed particularly in an image pick-up apparatus which uses the checkerboard shaped primary color filter.

Furthermore, according to an aspect of claim 11 of the present invention, the magnification or reduction of the picture is performed on each color with respect to a primary color signal from the camera signal processing unit which processes the picture signal without any change from the primary color signal at the time of image pick-up, and the amount of the iris diaphragm and the lens image height of the subject in the image pick-up lens are detected to control the conversion factor and the coordinate of the center of light axis for performing the magnification or reduction of the picture, so that the correction of the picture quality degradation which occurs in the miniaturized image pick-up lens can satisfactorily be performed particularly in an image pick-up apparatus to perform image pick-up of a color picture by providing an optical color filter on the image pickup surface of one piece of image pickup device.

Further, according to an aspect of claim 12 of the present invention, a display system processing unit configured to output a video signal from a second camera signal processing unit to a display apparatus or to an external output terminal, and/or a recording and reproducing unit configured to record a video signal from the second camera signal processing unit in a recording medium is included, so that a display and/or recording of a photographed picture can be performed easily.

According to an aspect of claim 13 of the present invention, an inverse conversion unit configured to inversely convert the video signal reproduced from the recording medium in the recording and reproducing unit into a primary color signal is provided and a signal from the inverse conversion unit is supplied to a first resolution conversion unit, so that the correction of the picture quality degradation can also be performed satisfactorily on the video signal recorded in the recording medium.

According to an aspect of claim 14 of the present invention, a second resolution conversion unit which performs a magnification or reduction of a picture of the whole screen with respect to the video signal from the second camera signal processing unit is further provided, so that the magnification and the reduction processing of the corrected video signal can be performed easily.

According to an aspect of claim 15 of the present invention, the first and second resolution conversion units are made to be one unit used in common by providing a signal switching unit before and after the unit, so that the correction is performed satisfactorily with a smaller circuit configuration.

According to an aspect of claim 16 of the present invention, a difference between a coordinate of a detected pixel on a screen and the coordinate of the center of light axis is used to detect a lens image height of a subject, so that correction processing of a picture signal can satisfactorily be performed.

According to an aspect of claim 17 of the present invention, since an automatic focus adjusting unit capable of controlling a focusing position is included and a coordinate of a controlled focusing position is made to represent the detecting pixels of the whole screen to be used for detecting the lens image height of the subject, the chromatic aberration correction for a part where the focus is not adjusted can be simplified and a circuit scale, processing time, consumption power, control software, a memory for storing lens data and the like can be reduced greatly.

According to an aspect of claim 18 of the present invention, a drive state of the image pick-up lens and an amount of camera shake correction is further detected; and the conversion factor for performing the magnification or reduction is controlled and the coordinate of the center of light axis for performing the magnification or reduction is controlled in the resolution conversion unit in accordance with the above further detected output in addition to the detected output, so that further favorable correction processing of the picture signal can be performed.

According to an aspect of claim 19 of the present invention, since an input unit configured to manually input information corresponding to a drive state of the iris diaphragm and the lens image height of the subject is provided in relation to a control unit, a user can set a desired amount of correction and the desired correction can be performed while checking a reproduced picture on a monitor, for example.

According to an aspect of the present invention, an image pick-up is performed using a checkerboard shaped primary color filter including a color separating unit of arbitrary three colors or more corresponding to each pixel; and a data memory unit in which chromatic aberration data specific to the image pick-up lens is stored for each color of the primary color filter and a computing unit which computes a control parameter to control the conversion factor and the coordinate of the center of light axis for performing the magnification or reduction in the control unit using the chromatic aberration data stored in the data memory unit and the detected output from the detection unit are included, so that the correction processing of the picture signal can satisfactorily be performed particularly in an image pick-up apparatus which uses the checkerboard shaped primary color filter.

According to an aspect of claim 21 of the present invention, the magnification or reduction of a picture is performed on each color with respect to a primary color signal from a camera signal processing unit which performs processing of the picture signal without any change from the primary color signal at the time of image pick-up, and also, the amount of the iris diaphragm and the lens image height of the subject in the image pick-up lens are detected to control the conversion factor and the coordinate of the center of light axis for performing the magnification or reduction of the picture, so that the picture quality degradation which occurs in the miniaturized image pick-up lens can be favorably corrected particularly in the image pick-up apparatus to perform the image pick-up of a color picture by providing an optical color filter on the image pickup surface of one piece of image pickup device.

Further, according to an aspect of claim 22 of the present invention, display system processing of outputting a video signal from a second camera signal processing to a display apparatus or to an external output terminal is performed and/or recording a video signal from the second camera signal processing unit in a recording medium is performed, so that a display and/or recording of a photographed picture can be performed easily.

According to an aspect of claim 23 of the present invention, a video signal reproduced from the recording medium is inversely converted into a primary color signal and a first resolution conversion is performed on the inversely converted signal, so that the correction of the picture quality degradation can also be performed satisfactorily on the video signal recorded in the recording medium.

According to an aspect of claim 24 of the present invention, a second resolution conversion in which a magnification or reduction of a picture of the whole screen is performed with respect to the video signal from the second camera signal processing is further performed, so that the magnification and reduction processing of the corrected video signal can be performed easily.

According to an aspect of claim 25 of the present invention, the first and second resolution conversion are performed by switching the signal supplied to a single block, so that the correction is performed satisfactorily with a smaller circuit configuration.

According to an aspect of claim 26 of the present invention, a difference between a coordinate of a detected pixel on a screen and the coordinate of the center of light axis is used to detect a lens image height of a subject, so that correction processing of a picture signal can satisfactorily be performed.

According to an aspect of claim 27 of the present invention, since an automatic focus adjusting unit capable of controlling a focusing position is included and a coordinate of a controlled focusing position is made to represent the detecting pixels of the whole screen to be used for detecting the lens image height of the subject, the chromatic aberration correction for a part where the focus is not adjusted can be simplified and a circuit scale, processing time, consumption power, control software, a memory for storing lens data and the like can be reduced greatly.

According to an aspect of the present invention, a drive state of the image pick-up lens and an amount of camera shake correction is further detected; and the conversion factor for performing the magnification or the reduction is controlled and the coordinate of the center of light axis for performing the magnification or the reduction is controlled in the resolution conversion unit in accordance with the above further detected output in addition to the detected output, so that further favorable correction processing of the picture signal can be performed.

According to an aspect of the present invention, since information corresponding to a drive state of the iris diaphragm and the lens image height of the subject can manually be input, a user can set a desired amount of correction and the desired correction can be performed while checking a reproduced picture on a monitor, for example.

According to an aspect of the present invention, a checkerboard shaped primary color filter including a color separating unit of arbitrary three colors or more corresponding to each pixel is provided in the image pickup unit, chromatic aberration data specific to the image pick-up lens is stored for each color of the primary color filter in a data memory unit, and a control parameter to control the conversion factor and the coordinate of the center of light axis for performing the magnification or the reduction in the control unit is computed using the chromatic aberration data stored in the data memory unit and the detected output from the detection unit, so that the correction processing of the picture signal can satisfactorily be performed particularly in an image pick-up apparatus which uses the checkerboard shaped primary color filter.

Accordingly, with conventional means, the problem of picture quality degradation such as color blurring or resolution degradation caused by the magnification chromatic aberration has occurred due to the miniaturization of the image pick-up lens or the like, it has been difficult to prevent sufficiently such picture quality degradation only with the image pick-up lens, and furthermore, means for satisfactorily realizing such correction has not been proposed in the image pick-up apparatus to perform the image pick-up of the color picture by providing an optical color filter on the image pickup surface of, for example, one piece of image pickup device; however, according to the present invention such problems can easily be solved.

Specifically, an image pick-up apparatus of the present invention includes: an image pick-up lens; an image pickup unit configured to convert image light having passed through the image pick-up lens into an electrical image signal; a first camera signal processing unit configured to process the image signal without any change from a primary color signal at a time of image pick-up; a first resolution conversion unit configured to perform a magnification or reduction of a picture on each color of the primary color signal at the time of image pick-up with respect to an output signal from the first camera signal processing unit; a detection unit provided in the image pick-up lens configured to detect a drive state of an iris diaphragm and a lens image height of a subject; a control unit configured to control a conversion factor and a coordinate of the center of light axis for performing the magnification or reduction in the first resolution conversion unit in accordance with an detected output from the detection unit; and a second camera signal processing unit configured to convert the output signal from the first resolution conversion unit into a video signal.

Further, an image processing apparatus of the present invention is the image processing apparatus used for an apparatus to perform image pick-up by converting image light having passed through an image pick-up lens into an electrical picture signal, including: a first camera signal unit configured to process a picture signal without any change from a primary color signal at a time of image pick-up; a first resolution conversion unit configured to perform a magnification or reduction of a picture on each color of the primary color signal at the time of image pick-up with respect to an output signal from the first camera signal processing unit; a detection unit provided in the image pick-up lens configured to detect a drive state of an iris diaphragm and a lens image height of a subject; a control unit configured to control a conversion factor and a coordinate of the center of light axis for performing the magnification or reduction in the first resolution conversion unit in accordance with a detected output from the detection unit; and a second camera signal processing unit configured to convert the output signal from the first resolution conversion unit into a video signal.

Furthermore, a method of correcting chromatic aberration of a lens according to the present invention is the method of correcting the chromatic aberration of the lens which is used for an apparatus to perform image pick-up by converting image light having passed through an image pick-up lens into an electrical picture signal, including steps of: performing a first camera signal processing on a picture signal without any change from a primary color signal at a time of image pick-up; performing a magnification or reduction of a picture on each color of the primary color signal at the time of image pick-up with respect to the signal on which the first camera signal processing is performed by a first resolution conversion; detecting a drive state of an iris diaphragm and a lens image height of a subject provided in the image pick-up lens; controlling a conversion factor and a coordinate of the center of light axis for performing the magnification or reduction in the first resolution conversion in accordance with a detected output; and converting a signal on which the first resolution conversion is performed into a video signal by a second camera signal processing.

BRIEF DESCRIPTION OF THE DRAWINGS

FIGS. 1A and 1B are block diagrams showing a configuration of an image pick-up apparatus which has been previously proposed by the inventors of the present application;

FIG. 4, consisting of FIG. 4A and FIG. 4B, is a diagram for an explanation of an operation thereof;

FIGS. 8A and 8B are block diagrams showing a configuration of an embodiment of an image pick-up apparatus, to which an image pick-up apparatus, an image processing apparatus and a method of correcting chromatic aberration of a lens according to the present invention are applied;

DESCRIPTION OF THE PREFERRED EMBODIMENTS

In order to explain the present invention hereinafter, first, the image pick-up apparatus which has been previously proposed by the inventers of the present application (Japanese Published Unexamined Patent Application No. 2003-30147) is explained as a premise thereof.

Figure 2:
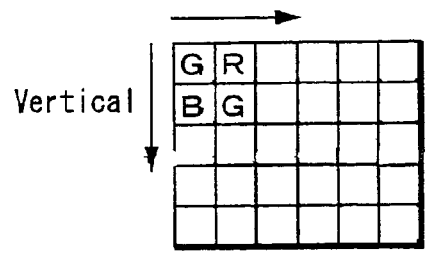
FIG. 2 is a diagram for an explanation thereof.

In FIGS. 1A and 1B, image light from a subject (not shown) is focused onto an image pickup surface of an image pickup unit 2 including a CCD or a CMOS sensor or the like through an image pick-up lens 1. Hereupon, a checkerboard shaped primary color filter corresponding to each pixel is provided on the image pickup surface of the image pickup unit 2 as shown in FIG. 2 for example, and an electrical signal corresponding to a light amount level of each primary color which is separated in the above primary color filter is taken out for each pixel from the image pickup unit 2. Then, the taken-out electrical signal is supplied to an A/D conversion circuit 3 to be converted into raw data of each primary color.

Further, this raw data of each primary color is stored in a picture memory 4. The picture memory 4 is controlled by a memory controller 5. Then, the raw data of each primary color read out arbitrarily from the picture memory 4 is supplied to a camera signal processing circuit 6 which performs the gamma-correction relating to the image pickup unit 2, a conversion from interlaced data to progressive data and the like. Moreover, an output signal from the camera signal processing circuit 6 is supplied to a signal-generating matrix circuit 7 which performs a conversion into picture signal data including, for example, an intensity (Y) signal and two color-difference (Cb, Cr) signals. Then, the converted picture signal data is stored in the picture memory 4 through a camera contact point of a switch 8.

Further, the picture signal data stored in the picture memory 4 is supplied to a resolution conversion processing circuit 9 for correcting chromatic aberration of a lens. Hereupon, in the resolution conversion processing circuit 9, the picture signal data from the picture memory 4 is supplied to a matrix circuit 91 to be returned to the raw data of each primary color and this raw data is supplied to a magnification-reduction circuit 92 to be converted into a desired picture size. Furthermore, the data is again converted into the picture signal data in a matrix circuit 93 and this converted picture signal data is stored again in the picture memory 4.

Figure 6:
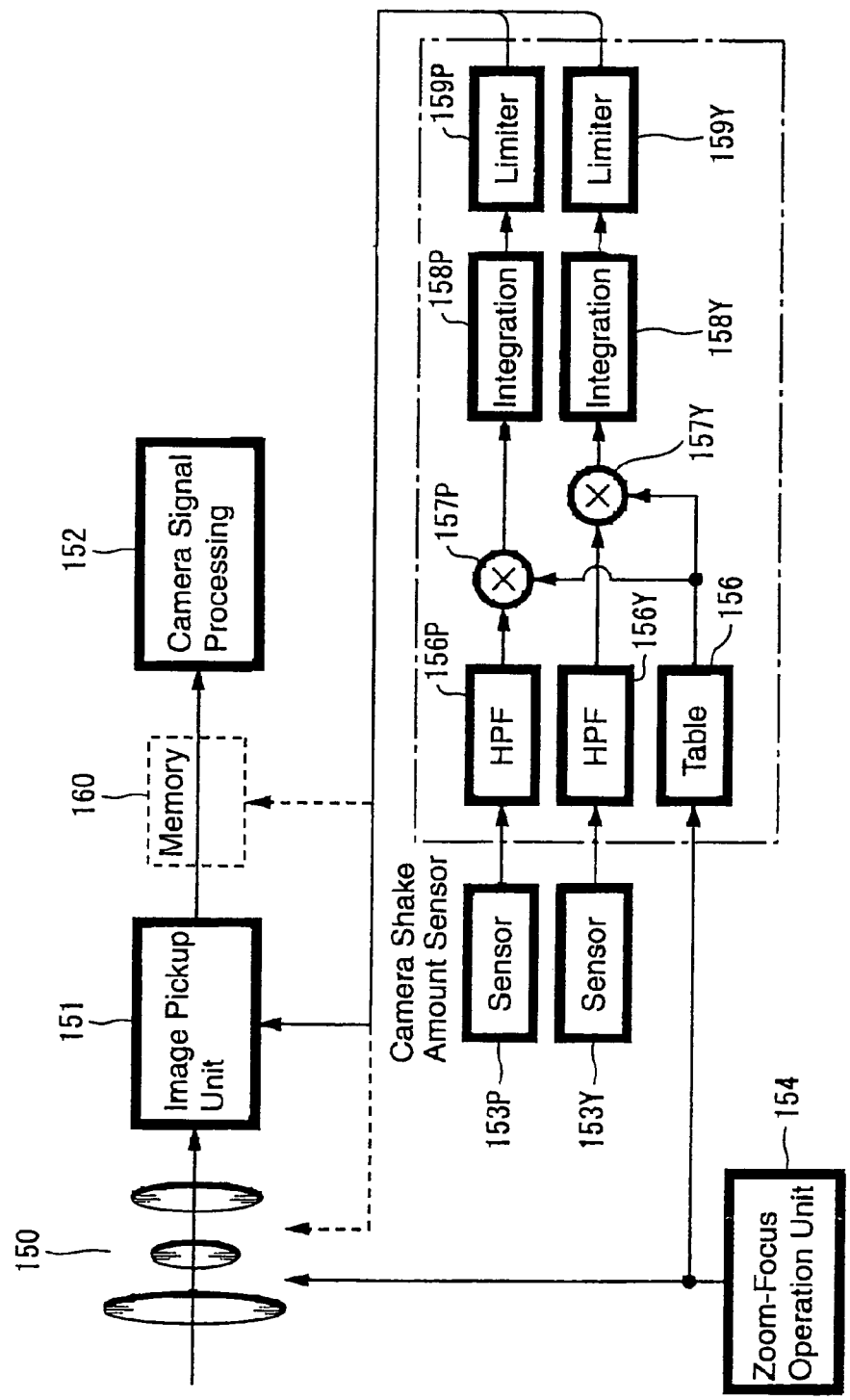
FIG. 6 is a block diagram for an explanation of a conventional camera shake correction means.

On the other hand, an angular velocity due to a camera shake in the directions of a pitch and a yaw is detected using, for example, two sensors 100P and 100Y, and this detected signal is supplied, for example, to a camera shake correction vector computing unit 101 in a control microcomputer 10. An operation in the camera shake correction vector computing unit 101 is performed as the operation corresponding to processing shown in a portion enclosed with a dashed line in a circuit configuration of the above described FIG. 6 for example, and thereby, angle information of the image pick-up lens 1 which is fluctuated by the camera shake is taken out.

Further, a detected value of a drive state such as a zoom focal length and a focal position of the image pick-up lens 1, a detected value of a drive state of an iris diaphragm (iris diaphragm value) which is provided in the image pick-up lens 1 and a detected value showing a picture coordinate of a pixel on which processing from the memory controller 5 is performed are supplied to a lens aberration data generating unit 102, and information on chromatic aberration of the lens is generated with respect to the pixel on which the processing is performed. Then, this information on the chromatic aberration of the lens and on the angle information of the above described camera shake correction is supplied to a parameter computing processing unit 103 to form a control parameter for correcting the chromatic aberration of the lens.

Figure 5:
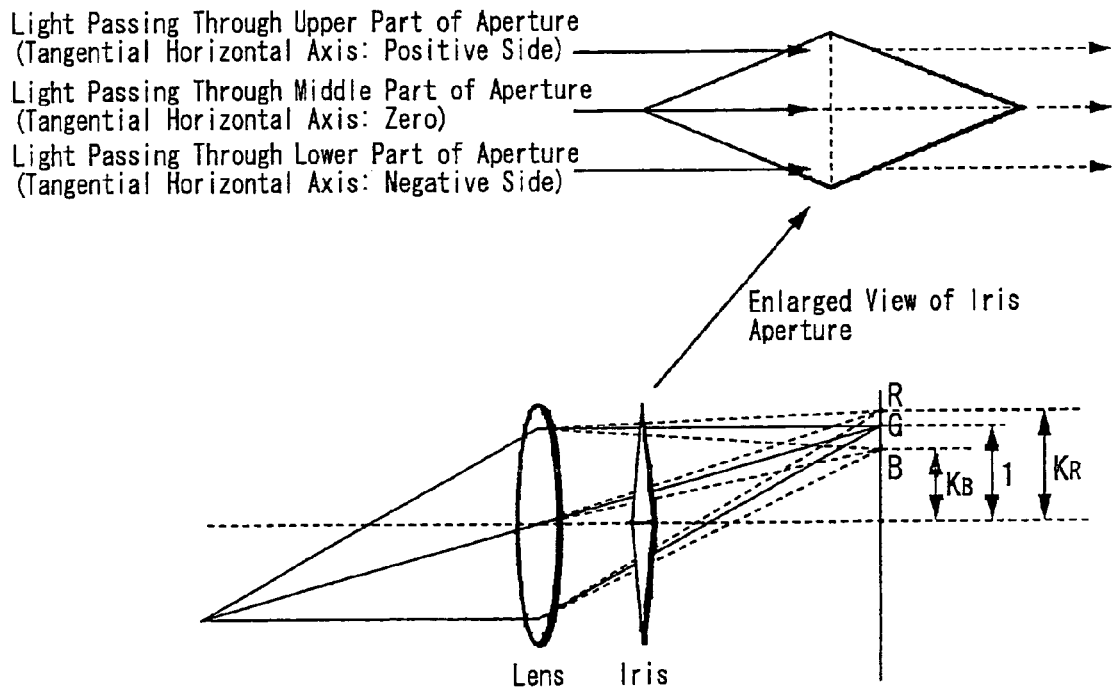
FIG. 5 is a diagram for an explanation of a chromatic aberration and an iris diaphragm.

Then, the control parameter formed in the parameter computing processing unit 103 is supplied to the resolution conversion processing circuit 9 for correcting the chromatic aberration of the lens. In other words, in the above described configuration, fluctuation ratios of a picture KR and KB due to the chromatic aberration shown in FIG. 5 [the ratio KR of the picture size of red (R) and the ratio KB of the picture size of blue (B) when a size of the picture of green (G) is put as 1] are determined according to an amount of an iris diaphragm 11, a lens image height of a subject, a zoom focal length of the image pick-up lens 1, a focal position and the like, and therefore, the ratios KR and KB are obtained from those detected signals.

Figure 3:
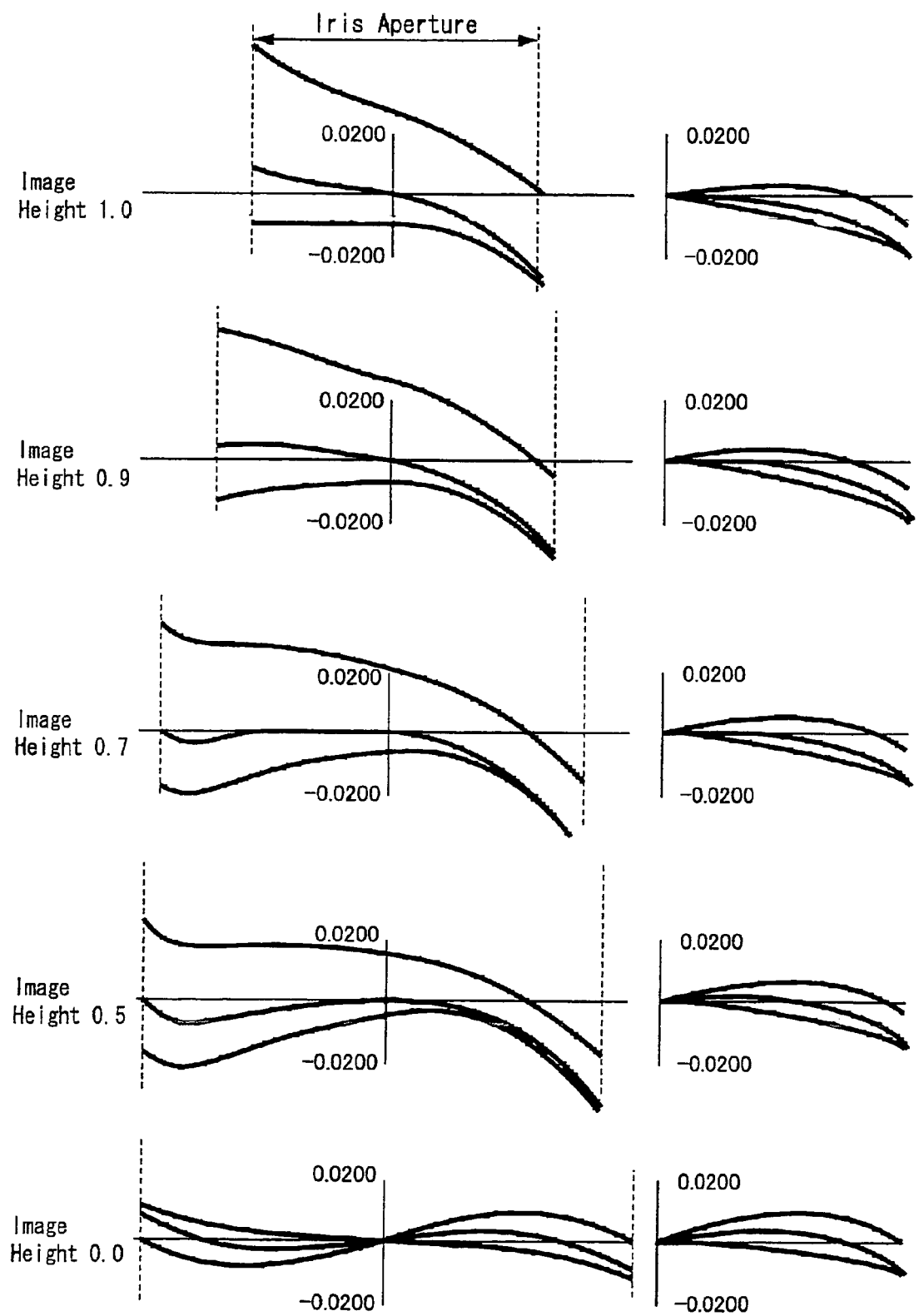
FIG. 3 is a characteristic curve diagram showing a relation between an amount of an iris diaphragm and an amount of a shift of an image-focusing position of each of three colors of primary light at each point of an image height.

Hereupon, the ratios KR and KB of the amount of the iris diaphragm 11 to the lens image height of the subject can be obtained from a characteristic curve in FIG. 3, for example. In FIG. 3, the center of a lens is expressed as an image height 0.0 and the edge of the lens is expressed as the image height 1.0, and a relationship between the amount of the iris diaphragm (horizontal axis) and the amount of shift of the image-forming position (vertical axis) of three primary colors (red: R, green: G, blue: B) is shown at points of the image height 0.0, the image height 0.5, the image height 0.7, the image height 0.9 and the image height 1.0 respectively from the bottom to upward. Specifically, each curve in FIG. 3 plots the amount of aberration for each color (R, G and B) which is generated depending on a part where the light of point of each image height of an aperture of the iris diaphragm shown in FIG. 5 passes through.

Note that, each diagram in the left side of FIG. 3 shows the characteristic of a vertical plane (TANGENTIAL) to the light axis and each diagram in the right side shows the characteristic of a horizontal plane (SAGITIAL) to the light axis. Moreover, a zoom position and a focal position are fixed to a certain point, respectively. Further, in the characteristic diagrams of the TANGENTIAL on the left side, a positive side of a horizontal axis shows with respect to the light which passes through an upper part of the aperture of the iris diaphragm and a negative side shows with respect to the light which passes through an lower part of the aperture of the iris diaphragm. Moreover, in the characteristic diagrams of the SAGITIAL on the right side, a negative side is omitted since the characteristic appears in right-left symmetry.

Furthermore, a unit in the vertical axis is a millimeter for both the TANGENTIAL and SAGITIAL, and the positive side means an outer side of the lens and the negative side means a center side of the lens. Moreover, it is assumed that the characteristic curve of the green (G) passes through a point of zero, and the other characteristic curves of the red (R) and the blue (B) are shown using relative values to the green (G).

Therefore, it can be understood from FIG. 3 that the direction in which the chromatic aberration appears and the amount thereof are fluctuated depending on the amount of the iris diaphragm and the lens image height of the subject in the image pick-up lens. In other words, there arises a necessity to correct not only the chromatic aberration which is generated in the above described lens but also the color smear which is generated in the image pick-up lens with respect to the amount of the iris diaphragm and the lens image height of the subject in the image pick-up lens. Note that, a difference in the direction of the vertical axis for each color corresponds to the amount of correction in FIG. 3. Accordingly, when the size of the picture of the blue (B) light is reduced, for example, to be fit to the picture of the green (G) light, a difference between the image-forming positions of two colors can be read out from the characteristic curve in FIG. 3.

Then, for example, when the difference read out from the characteristic curve of FIG. 3 is 20 μm and a unit cell size of the image pickup unit 2 is, for example, 2.7 μm×2.7 μm in an arbitrary amount of the iris diaphragm 11 and lens image height of the subject, the difference becomes 20 μm/2.7 μm=7.4 pixels and it becomes possible to be fit to the picture of the green (G) light if correction processing is performed on the picture of the blue (B) light to reduce the whole picture by 7.4 pixels.

Specifically, the ratios KR and KB of the amount of the iris diaphragm 11 to the lens image height of the subject can be obtained from the above mentioned characteristic curve of FIG. 3. In addition, since the zoom position and the focal position are fixed to the certain point in the characteristic curve of FIG. 3, a conversion ratio (control parameter) for the final correction which is performed in the resolution conversion processing circuit 9 can be obtained by further adding a ratio corresponding to a zoom focal length, a focal position of the image pick-up lens 1 and the like to the obtained ratios KR and KB which are mentioned above.

Furthermore, when a picture having chromatic aberration as shown in the left end of FIG. 4B is supplied instead of, for example, a picture formed by an ideal image focusing as shown in FIG. 4A, this picture is separated into three primary colors (R, G and B) and among them a picture of red (R) is reduced and a picture of blue (B) is magnified, for example, so that a size of each picture can be made equal in the magnification-reduction circuit 92 of the resolution conversion processing circuit 9 with the supply of this control parameter. Further, the pictures of those three primary colors (R, G and B) are again combined and a picture which is close to the picture produced by the ideal image formation is formed as shown in the right end of FIG. 4B.

Moreover, a control of an original size of recorded picture is also performed in the resolution conversion processing circuit 9. In this case, information on the size of the recorded picture set, for example, by a user is input into a magnification-reduction processing control unit 104 of the control computer 10, and generated control information is supplied to the resolution conversion processing circuit 9. Accordingly, the control for the size of recorded picture is performed in the above mentioned magnification-reduction circuit 92. Note that, since the magnification-reduction in this case is performed with respect to the whole picture, picture data may remain as the intensity (Y) signal and two color-difference (Cb, Cr) signals, for example.

Thus, the picture data on which the correction and the magnification-reduction are performed is stored in the picture memory 4. Then, the picture signal data stored in the picture memory 4 is supplied to a display system processing circuit 12 to generate display picture data which is supplied to a display apparatus 13 such as the LCD or a picture output terminal 14. Further, the picture signal data stored in the picture memory 4 is supplied to an image compression-decompression processing circuit 15 to perform compression processing of the picture data. Then, the compressed picture data, which is processed, is recorded in a recording medium 20 such as a semiconductor memory, a magnetic disc, an optical disc and so on.

Further, the compressed picture data recorded in the recording medium 20 is supplied to the image compression-decompression processing circuit 15 to perform decompression of the compressed picture data. Then, the decompressed picture data is supplied to a reproduction contact point of the switch 8 through one of contact points in a switch 16 to be stored in the picture memory 4. In addition, when the picture signal data stored in the picture memory 4 is not compressed, the data is directly supplied to the reproduction contact point of the switch 8 through the other side of the contact points in the switch 16 to be stored in the picture memory 4.

Accordingly, reproduction of the picture signal data recorded in the recording medium 20 is performed and the reproduced picture data is stored in the picture memory 4. Then, this picture data stored in the picture memory 4 is supplied to the resolution conversion processing circuit 9 and such processing as the above described correction of the chromatic aberration of the lens is performed. Note that, with respect to a control parameter at the time of reproduction, requiring data is detected at a time of image pick-up to be recorded together with the picture data in the recording medium 20, or the parameter is generated by observing the reproduced picture which is displayed on the display apparatus 13 and by manually inputting data into the parameter computing unit 103 from a user interface.

Further, in the above mentioned apparatus, the control of the signal processing circuit 6 and the signal-generating matrix circuit 7 is performed in accordance with a signal from a camera signal processing control unit 105 of the control microcomputer 10, for example. Furthermore, the control of the display system processing circuit 12 and the picture compression-decompression processing circuit 15 is also performed in accordance with the signal from the control microcomputer 10, for example.

Therefore, according to this apparatus, means to perform the magnification or reduction of the picture for each color of the primary color signal and means to detect the angle information on the image pick-up lens which is fluctuated by the camera shake, the amount of the iris diaphragm and the lens image height of the subject in the image pick-up lens are used to control the conversion factor and the coordinate of the center of light axis for performing the magnification or reduction of the picture in accordance with those detected outputs, so that the picture quality degradation which occurs in the miniaturized image pick-up lens can be corrected satisfactorily with the processing with respect to the photographed picture signal.

Then, the present invention is further made to perform satisfactorily the correction of the picture quality degradation which occurs in the miniaturized image pick-up lens, when the above described image pick-up apparatus which has been previously proposed by the inventors of the present application is applied to an image pick-up apparatus to perform image pick-up of a color picture by providing an optical color filter on, for example, an image pickup surface of one piece of image pickup device.

Figure 8B:
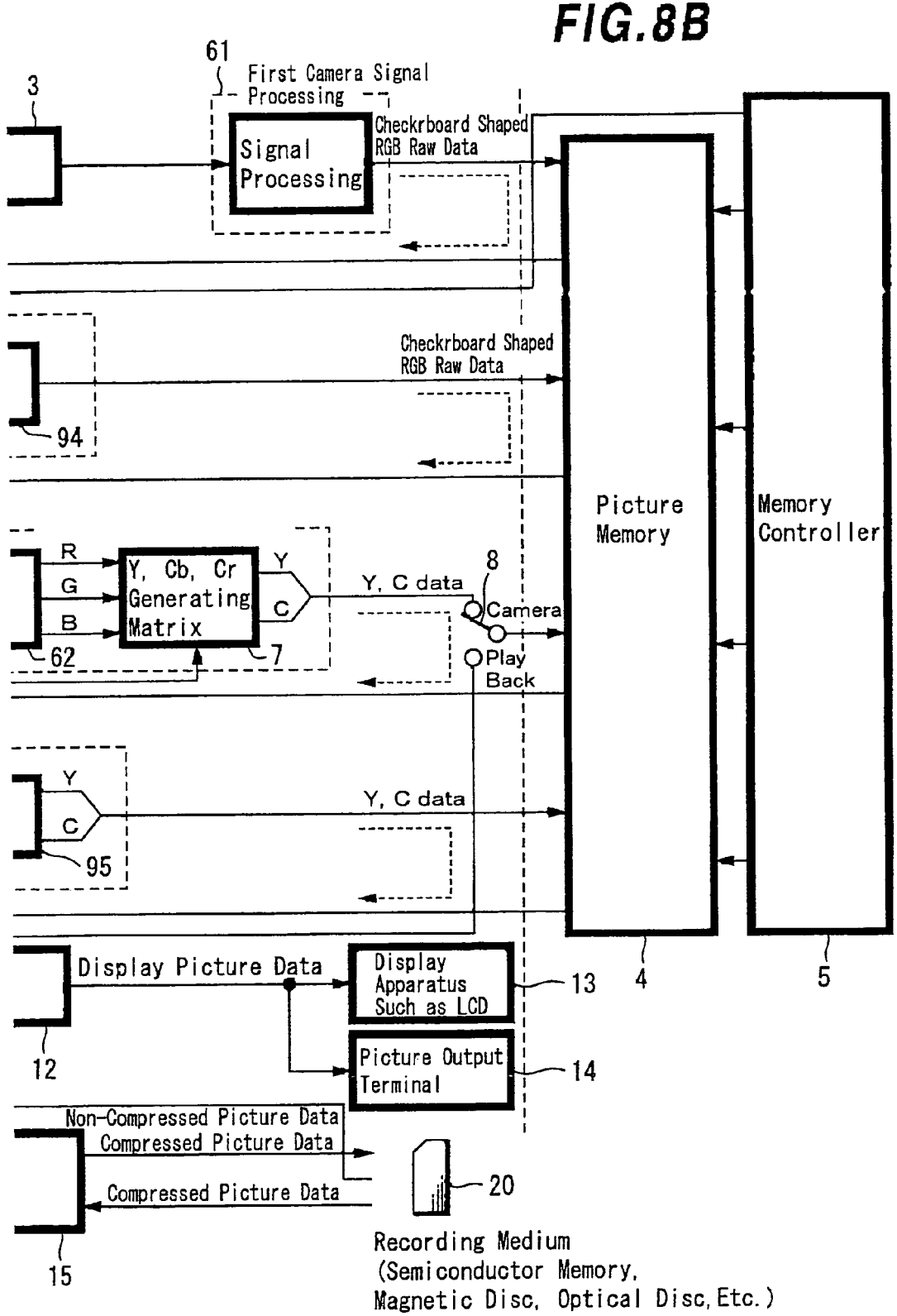

Hereinafter, an explanation is made to the present invention referring to the accompanied drawings. FIGS. 8A and 8B are block diagrams showing a configuration of an embodiment of an image pick-up apparatus to which an image pick-up apparatus, an image processing apparatus and a method of correcting chromatic aberration of a lens according to the present invention are applied. It should be noted that, in the explanation of FIGS. 8A and 8B, the same reference numerals as those in the above mentioned FIGS. 1A and 1B are given to parts used in common, and a detailed explanation thereof is omitted. In addition, with respect to a part relating to a camera shake correction vector, an explanation thereof is omitted.

In FIGS. 8A and 8B, image light from a subject (not shown) is focused on the image pickup surface of the image pickup unit 2 including the CCD or the CMOS sensor or the like through the image pick-up lens 1. Hereupon, the checkerboard shaped primary color filter as shown in FIG. 2, for example, is provided corresponding to each pixel in the image pickup surface of the image pickup unit 2, and an electrical signal corresponding to a light amount level of each primary color which is separated in the above described primary color filter is taken out for each pixel in the image pickup unit 2. Then, the taken-out electrical signal is supplied to the A/D conversion circuit 3 to be converted into raw data of each primary color.

The raw data of each primary color from the A/D conversion circuit 3 is supplied to a first camera signal processing circuit 61 without any change. Only basic video signal processing such as the gamma-correction, for example, is performed in the first camera signal processing circuit 61. Then, the raw data of each primary color processed in the first camera signal processing circuit 61 is stored in the picture memory 4. Further, the raw data of each primary color stored in the picture memory 4 is supplied to a magnification-reduction circuit 94 which functions as a first resolution conversion processing circuit for performing the correction of the chromatic aberration of the lens.

Specifically, the raw data of each primary color processed only in the first camera signal processing circuit 61 is supplied to the magnification-reduction circuit 94 in this apparatus, and therefore, processing for the correction of the chromatic aberration of the lens can be performed without using a matrix circuit or the like to reproduce the primary color data in the magnification-reduction circuit 94 functioning as the first resolution conversion processing circuit. Then, the raw data of each primary color on which the correction of the chromatic aberration of the lens is performed in the magnification-reduction circuit 94 is stored in the picture memory 4.

Furthermore, in this apparatus, a control parameter is supplied to the magnification-reduction circuit 94 functioning as the first resolution conversion processing circuit in a manner described below, for example.

Specifically, the checkerboard shaped primary color filter as shown in, for example, FIG. 2 is provided corresponding to each pixel in the image pickup surface of the image pickup unit 2 in this apparatus. Due to the above, pixels corresponding to color filters of green (G) and red (R) are taken out alternately from the image pickup unit 2 in, for example, every other horizontal scanning line as shown in A1 of FIG. 9, and pixels corresponding to color filters of blue (B) and green (G) are taken out alternately as shown in B1 of FIG. 9 in the remaining horizontal scanning lines.

Figures 7, 9:
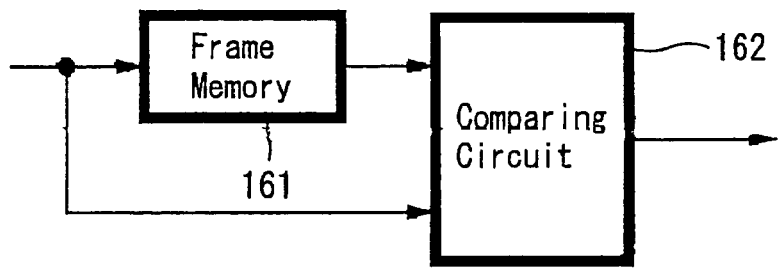
FIG. 7 is a diagram for an explanation thereof.
FIG. 9 is a timing chart diagram showing an output of a video signal.

Therefore, in this case, a conversion ratio of green (G) and a conversion ratio of red (R) are required alternately as shown in A2 of FIG. 9 in the horizontal scanning line shown in A1 of FIG. 9 from which the pixels of green (G) and red (R) are alternately taken out. Further, a conversion ratio of blue (B) and a conversion ratio of green (G) are required alternately as shown in B2 of FIG. 9 in the horizontal scanning line shown in B1 of FIG. 9 from which pixels of blue (B) and green (G) are alternately taken out.

Figure 10:
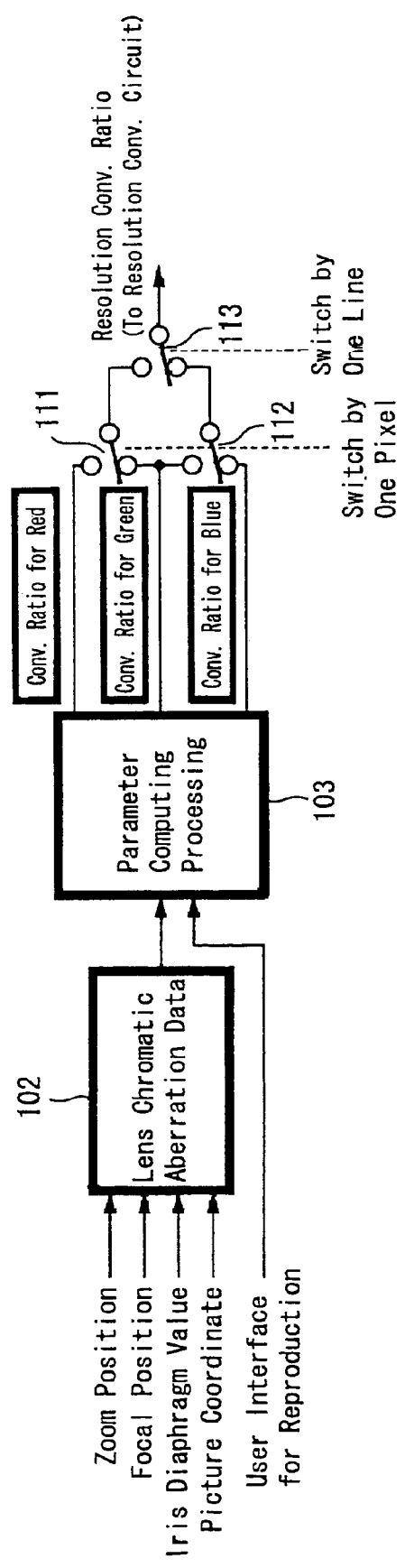
FIG. 10 is a constitutional diagram of switching means.

Then, switching between parameters of green (G) and red (R) and parameters of blue (B) and green (G) is performed by one pixel period using switches 111 and 112 with respect to the control parameter supplied from the parameter computing processing unit 103 as shown in FIG. 10 for example, and also, switching between the parameters from the switch units 111 and 112 is further performed by one horizontal period using a switch unit 113. Accordingly, an efficiency of the operation can be improved by continuously performing the computation of each parameter, and the control parameters can be supplied extremely easily.

Furthermore, the raw data of each primary color arbitrarily read out from the picture memory 4 is supplied to a second camera signal processing circuit 62 which performs conversion from interlaced data to progressive data, and the like. Further, an output signal from the camera signal processing circuit 62 is supplied to the signal generating matrix circuit 7 which performs conversion into the picture signal data including the intensity (Y) signal and two color difference (Cb, Cr) signals, for example. Then, the converted picture signal data is stored in the picture memory 4 through the camera contact point of the switch 8.

Further, the picture signal data including, for example, the intensity (Y) signal and two color difference (Cb, Cr) signals which is stored in the picture memory 4 is supplied to a magnification-reduction circuit 95 which functions as a second resolution conversion processing circuit to perform a control of a size of the recorded picture and the like. Note that, since the magnification-reduction in this case is performed on the whole picture, there is no need to convert the picture data of the intensity (Y) signal and two color difference (Cb, Cr) signals, for example. Thus, the correction of the chromatic aberration of the lens and the control of the size of the recorded picture are performed on the photographed picture. In addition, other configuration than those mentioned above is the same as the configuration of FIGS. 1A and 1B.

Therefore, in this embodiment, the magnification or reduction of the picture is performed on each color of the primary color signal from the camera signal processing unit which performs processing of the picture signal without any change from the primary color signal at the time of image pick-up, and also, the amount of the iris diaphragm and the lens image height of the subject in the image pick-up lens are detected to control the conversion factor and the coordinate of the center of light axis for performing the magnification or reduction of the picture, so that the correction of the picture quality degradation which occurs in the miniaturized image pick-up lens can be performed satisfactorily particularly in the image pick-up apparatus to perform the image pick-up of the color picture by providing an optical color filter on the image pickup surface of one piece of image pickup device.

Accordingly, in an conventional apparatus, there has occurred the problem of the picture quality degradation such as the color blurring or the resolution degradation caused by the magnification chromatic aberration due to the miniaturization of the image pick-up lens and the like, it has been difficult to prevent sufficiently such picture quality degradation only with the image pick-up lens, and furthermore, there has not been proposed means to realize satisfactorily such correction in the image pick-up apparatus performing the image pick-up of the color picture by providing an optical color filter, for example, on the image pickup surface of one piece of the image pickup device; however, according to the present invention such problems can be solved without difficulty.

However, according to the above mentioned embodiment, it is not possible to perform the processing of correcting the chromatic aberration of the lens with respect to the picture signal data reproduced from the recording medium 20 in the image pick-up apparatus shown in FIGS. 1A and 1B. Then, when it is also desired to perform such processing, the matrix circuit 91 to return the picture signal data from the picture memory 4 to the raw data of each primary color and the matrix circuit 93 to convert the data into the picture signal data again, which are the same as those in FIGS. 1A and 1B, are provided before and after the magnification-reduction circuit 94. With this configuration, it becomes also possible to perform the processing of correcting the chromatic aberration of the lens on the picture signal data reproduced from the recording medium 20.

Figure 11A:
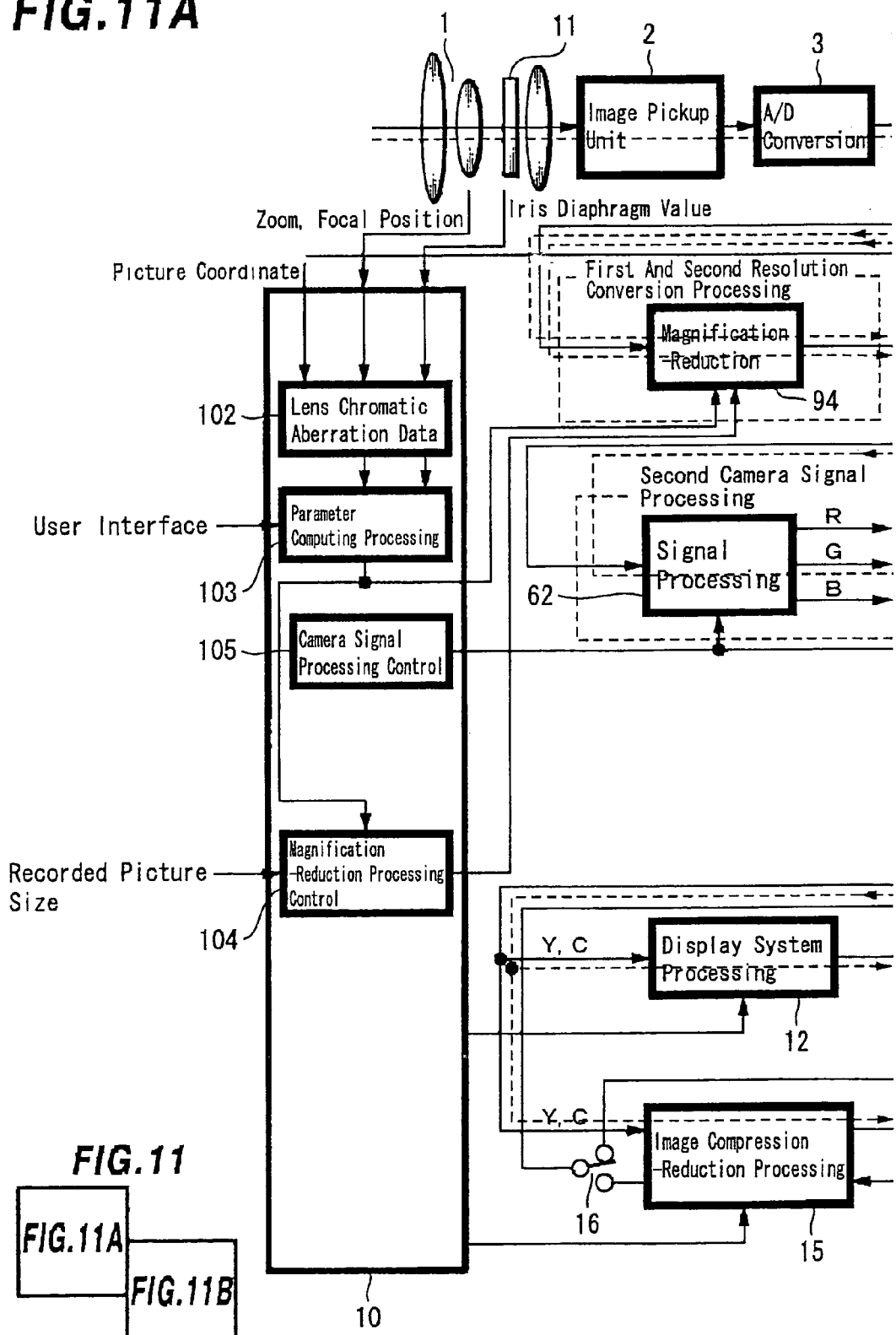
FIGS. 11A and 11B are block diagrams showing a configuration of another embodiment of the present invention.
Figure 11:
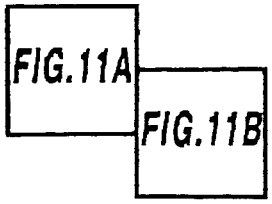
Figure 11B:
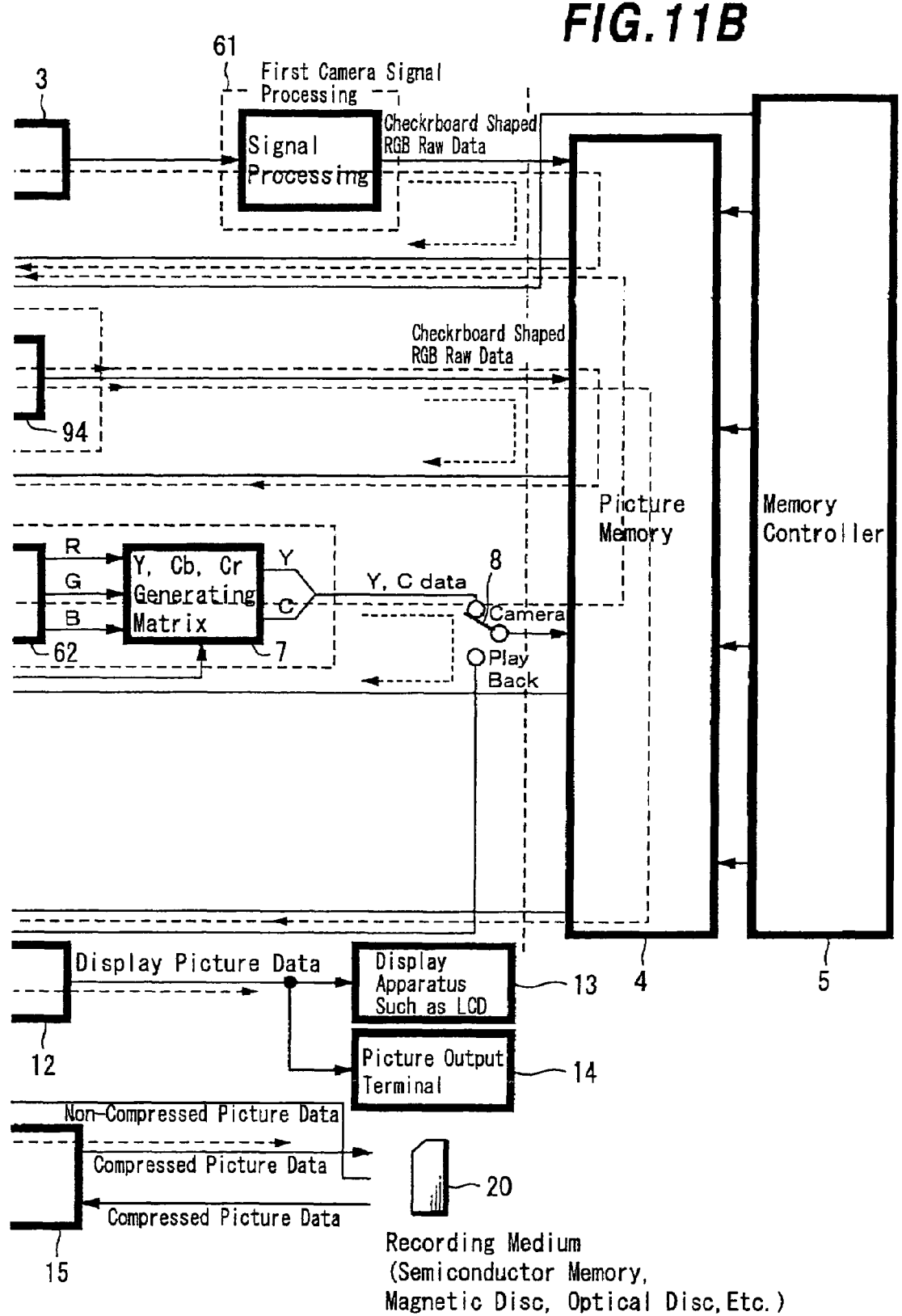

Furthermore, another embodiment of the present invention is shown in FIGS. 11A and 11B. Specifically, in FIGS. 11A and 11B, the magnification-reduction circuit 94 functioning as the first resolution conversion processing circuit for the correction of the chromatic aberration of the lens and the magnification-reduction circuit 95 which becomes the second resolution conversion processing circuit to perform the control of the size of the recorded picture or the like are used in common. Therefore, according to this embodiment, the picture signal data converted in the signal generating matrix circuit 7 and stored in the picture memory 4 is again supplied to the magnification-reduction circuit 94 to perform the control of the size of the recorded picture or the like.

According to this, since the magnification-reduction circuit is used in common, a circuit configuration can be simplified. Note that, with respect to the processing in the magnification-reduction circuit, data can be similarly handled regardless of being the raw data of each primary color or being the picture signal data including the intensity (Y) signal and two color difference (Cb, Cr) signals. In other words, since the picture memory 4 is used as an exchange unit of the signal data according to this embodiment, the magnification-reduction circuit can be used in common.

Figure 12:
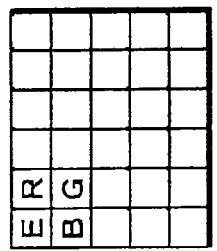
FIG. 12 is a diagram for an explanation of further another embodiment of the present invention.
Figure 13:
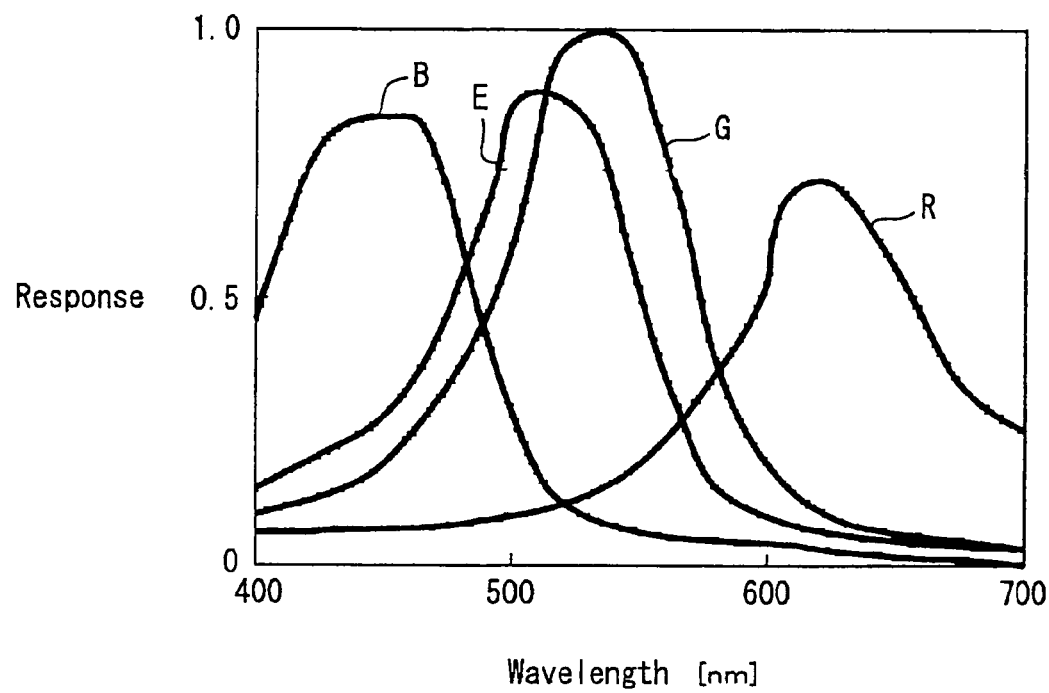
FIG. 13 is a diagram of spectroscopic characteristics of a four-color filter.

Furthermore, the applicants of the present invention have previously proposed an apparatus which uses a checkerboard shaped primary color filter of four colors as shown in FIG. 12, for example, in an image pick-up apparatus which performs the image pick-up of the color picture by providing an optical color filter, for example, on the image pickup surface of one piece of image pickup device (refer to http://www.sony.co.jp/SonyInfo/News/Press/200307/03-029/). Specifically, the primary colors of red (R), green (G), blue (B) and also emerald (E) are used as the four colors in the primary color filter of FIG. 12. Hereupon, spectroscopic characteristics of those four colors are those as shown in FIG. 13, for example.

Figure 14:
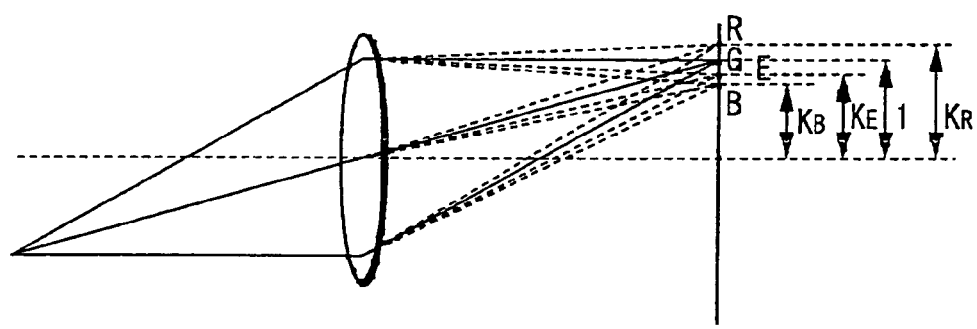
FIG. 14 is a diagram for an explanation of chromatic aberration thereof.
Figure 15:
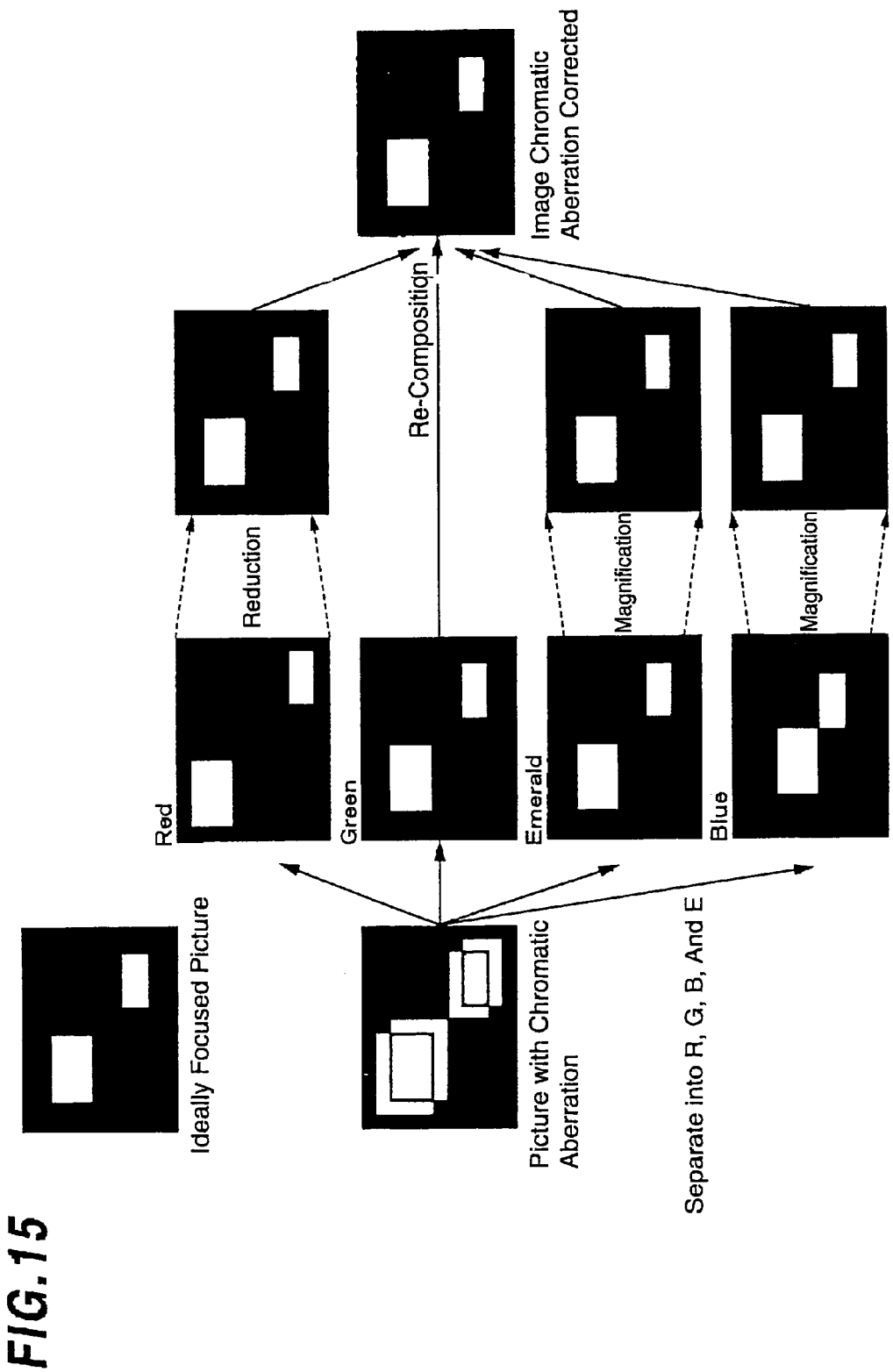
FIG. 15 is a diagram for an explanation of a processing operation thereof.

Then, when such four colors are used, chromatic aberration caused by an optical lens becomes the one as shown in FIG. 14, for example. Specifically, the aberration of a picture of emerald (E) is positioned in the middle of green (G) and blue (B). Then, in order to correct such aberration, a picture of green (G) is taken as a reference, a picture of red (R) is reduced, a picture of blue (B) is magnified, and also, the picture of emerald (E) is magnified to the amount less than that of the picture of blue (B) as shown in FIG. 15, for example.

Figure 16:
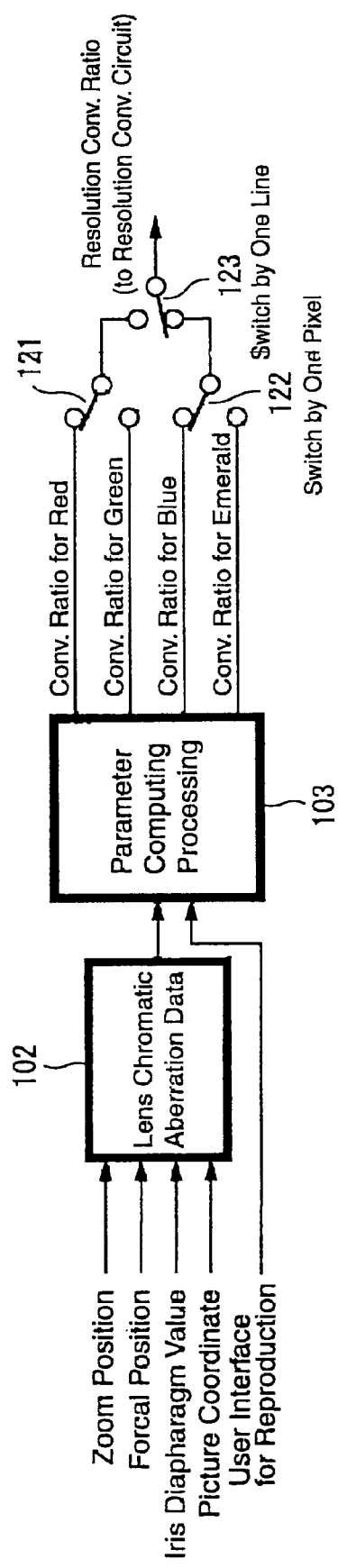
FIG. 16 is a constitutional diagram of switching means thereof.

In other words, control parameters corresponding to the above described red (R), green (G), blue (B) and emerald (E) are computed in the parameter computing unit 103 in this case. Then, as shown in FIG. 16 for example, switching between the parameters of green (G) and red (R) or switching between the parameters of blue (B) and emerald (E) is performed by one pixel period using switches 121 and 122, and also, switching between the parameters from the switches 121 and 122 are further performed by one horizontal period using a switch 123. Accordingly, an efficiency of the operation can be improved by continuously performing the computation of the respective parameters, so that the control parameter can be supplied quite easily.

In this manner, it is possible to perform the correction of the chromatic aberration caused by the optical lens even in the image pick-up apparatus which uses the checkerboard shaped primary color filter of four colors.

Thus, the above described image pick-up apparatus according to the present invention includes: an image pick-up lens; an image pickup unit to convert image light having passed through the image pick-up lens into an electrical picture signal; a first camera signal processing unit to process the picture signal without any change from the primary color signal at the time of image pick-up; a first resolution conversion unit to perform magnification or reduction of the picture on each color of the primary color signal at the time of image pick-up with respect to an output signal from the first camera signal processing unit; a detection unit provided in the image pick-up lens to detect a drive state of an iris diaphragm and a lens image height of a subject; a control unit to control the conversion factor and the coordinate of the center of light axis for performing the magnification or reduction in the first resolution conversion unit in accordance with the detected output from the detection unit; and a second camera signal processing unit to convert the output signal from the first resolution conversion unit into the video signal, so that the correction of the picture quality degradation which occurs in a miniaturized image pick-up lens can be performed satisfactorily particularly in the image pick-up apparatus to perform the image pick-up of the color picture by providing an optical color filter on the image pickup surface of one piece of image pickup device.

Further, the above described image processing apparatus according to the present invention is an image processing apparatus used for an apparatus to perform an image pick-up by converting image light having passed through an image pick-up lens into an electrical picture signal, including: a first camera signal processing unit to process a picture signal without any change from a primary color signal at the time of image pick-up; a first resolution conversion unit to perform magnification or reduction of a picture on each color of the primary color signal at the time of image pick-up with respect to an output signal from the first camera signal processing unit; a detection unit provided in the image pick-up lens to detect a drive state of the iris diaphragm and the lens image height of the subject; a control unit to control the conversion factor and the coordinate of the center of light axis for performing the magnification or reduction in the first resolution conversion unit in accordance with the detected output from the detection unit; and a second camera signal processing unit to convert an output signal from the first resolution conversion unit into a video signal, so that the correction of the picture quality degradation which occurs in a miniaturized image pick-up lens can be performed satisfactorily particularly when being applied to the image pick-up apparatus to perform the image pick-up of the color picture by providing an optical color filter on the image pickup surface of one piece of image pickup device.

Furthermore, the above mentioned method of correcting the chromatic aberration of a lens according to the present invention is the method for correcting the chromatic aberration of the lens, which is used for the apparatus to perform an image pick-up by converting an image light having passed through an image pick-up lens into an electrical picture signal, in which first camera signal processing is performed on the picture signal without any change from the primary color signal at the time of image pick-up; magnification or reduction of a picture is performed by a first resolution conversion on each color of the primary color signal at the time of image pick-up with respect to the signal to which the first camera signal processing is performed; a drive state of the iris diaphragm and the lens image height of the subject which are provided in the image pick-up lens are detected; the conversion factor and the coordinate of the center of light axis for performing the magnification or reduction in the first resolution conversion are controlled in accordance with the detected output; and the signal to which the first resolution conversion is performed is converted into a video signal by the second camera signal processing, so that particularly when the image pick-up of the color picture is performed by providing an optical color filter on the image pickup surface of one piece of image pickup device, the correction of the picture quality degradation which occurs in a miniaturized image pick-up lens can be performed satisfactorily.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An image pick-up apparatus, comprising:
an image pick-up lens;
an image pickup unit configured to convert image light having passed through said image pick-up lens into an electrical picture signal;
a first camera signal processing unit configured to process said picture signal without any change from a primary color signal at a time of image pick-up;
a first resolution conversion unit configured to perform a magnification or reduction of a picture on each color of said primary color signal at the time of said image pick-up with respect to an output signal from said first camera signal processing unit;
a detection unit provided in said image pick-up lens configured to detect a drive state of an iris diaphragm and a lens image height of a subject;
a control unit configured to control a conversion factor and a coordinate of the center of light axis for performing the magnification or reduction in said first resolution conversion unit in accordance with a detected output from said detection unit;
a second camera signal processing unit configured to convert an output signal from said first resolution conversion unit into a video signal;

a primary color filter including a color separating unit of arbitrary three colors or more corresponding to each pixel in said image pickup unit;

data memory unit in which chromatic aberration data specific to said image pick-up lens is stored for each color of said primary color filter; and a computing unit configured to compute a control parameter which controls the conversion factor and the coordinate of the center of light axis for performing said magnification or reduction in said control unit using said chromatic aberration data stored in said data memory unit and the detected output from said detection unit.

2. The image pick-up apparatus according to claim 1, further comprising:

a display system processing unit configured to output the video signal from said second camera signal processing unit to a display apparatus or to an external output terminal and/or a recording and reproducing unit configured to record the video signal from said second camera signal processing unit in a recording medium.

3. The image pick-up apparatus according to claim 2, further comprising:

an inverse conversion unit configured to inversely convert a video signal reproduced from said recording medium in said recording and reproducing unit into a primary color signal, wherein a signal from said inverse conversion unit is supplied to said first resolution conversion unit.

4. The image pick-up apparatus according to claim 1, further comprising:

a second resolution conversion unit configured to perform a magnification or reduction of a picture of the whole screen with respect to the video signal from said second camera signal processing unit.

5. The image pick-up apparatus according to claim 4, wherein said first and second resolution conversion units are made into one unit used in common by providing signal switching units prior to and subsequent to the unit.

6. The image pick-up apparatus according to claim 1, wherein a difference between a coordinate of a detected pixel on a screen and a coordinate of the center of light axis is used for the detection of said lens image height of the subject.

7. The image pick-up apparatus according to claim 1, further comprising:

an automatic focus adjusting unit capable of controlling a focusing position, wherein a coordinate of said controlled focusing position is made to represent said detecting pixels of the whole screen to be used for the detection of said lens image height of the subject.

8. The image pick-up apparatus according to claim 1, wherein a drive status and an amount of camera shake correction of said image pick-up lens are further detected, and the conversion factor for performing the magnification or reduction is controlled and said coordinate of the center of light axis for performing the magnification or reduction is controlled in said resolution conversion unit, in accordance with said further detected output in addition to said detected output.

9. The image pick-up apparatus according to claim 1, further comprising:

an input unit configured to input manually information corresponding to said drive state of the iris diaphragm and lens image height of the subject in relation to said control unit.

10. An image processing apparatus used for an apparatus performing an image pick-up by converting image light having passed through an image pick-up lens into an electrical picture signal, comprising:

a first camera signal processing unit configured to process said picture signal without any change from a primary color signal at a time of image pick-up;

a first resolution conversion unit configured to perform a magnification or reduction of a picture on each color of said primary color signal at the time of image pick-up with respect to an output signal from said first camera signal processing unit;

a detection unit provided in said image pick-up lens configured to detect a drive state of an iris diaphragm and a lens image height of a subject;

a control unit configured to control a conversion factor and a coordinate of the center of light axis for performing the magnification or reduction in said first resolution conversion unit in accordance with a detected output from said detection unit;

a second camera signal processing unit configured to convert an output signal from said first resolution conversion unit into a video signal;

a primary color filter including a color separating unit of arbitrary three colors or more with respect to each pixel to perform said image pickup;

a data memoiy unit in which chromatic aberration data specific to said image pick-up lens is stored for each color of said primary color filter; and a computing unit configured to compute a control parameter for controlling said conversion factor and coordinate of the center of light axis for performing the magnification or reduction in said control unit using said chromatic aberration data stored in said data memory unit and the detected output from said detection unit.

11. The image processing apparatus according to claim 10, further comprising:

a display system processing unit configured to output the video signal from said second camera signal processing unit to a display apparatus or to an external output terminal, and/or a recording and reproducing unit configured to record the video signal from said second camera signal processing unit in a recording medium.

12. The image processing apparatus according to claim 11, further comprising:

an inverse conversion unit configured to convert inversely the video signal reproduced from said recording medium in said recording and reproducing unit into a primary color signal, wherein a signal from said inverse conversion unit is supplied to said first resolution conversion unit.

13. The image processing apparatus according to claim 10, further comprising:

a second resolution conversion unit configured to perform a magnification or reduction of a picture of the whole screen with respect to the video signal from said second camera signal processing unit.

14. The image processing apparatus according to claim 13, wherein
said first and second resolution conversion units are made into one unit used in common by providing signal switching units prior to and subsequent to the unit.

15. The image processing apparatus according to claim 10, wherein
a difference between a coordinate of a detected pixel on a screen and the coordinate of the center of light axis is used to detect said lens image height of the subject.

16. The image processing apparatus according to claim 10, further comprising:
an automatic focus adjusting unit capable of controlling a focusing position, wherein
a coordinate of said controlled focusing position is made to represent said detecting pixels of the whole screen to be used for the detection of said lens image height of the subject.

17. The image processing apparatus according to claim 10, wherein
a drive state and an amount of camera shake correction of said image pick-up lens are further detected, and
the conversion factor for performing the magnification or reduction is controlled and also said coordinate of the center of light axis for performing the magnification or reduction is controlled in said resolution conversion unit, in accordance with said further detected output in addition to said detected output.

18. The image processing apparatus according to claim 10, further comprising:
an input unit configured to input manually information corresponding to said drive state of the iris diaphragm and lens image height of the subject in relation to said control unit.

19. A method of correcting chromatic aberration of a lens used for an apparatus to perform image pick-up by converting image light having passed through an image pick-up lens into an electrical picture signal, comprising steps of:
performing a first camera signal processing on said picture signal without any change from a primary color signal at a time of image pick-up;
performing a magnification or reduction of a picture by a first resolution conversion on each color of said primary color signal at the time of image pick-up with respect to a signal on which said first camera signal processing is performed;
detecting a drive state of an iris diaphragm and a lens image height of a subject which are provided in said image pick-up lens;
controlling a conversion factor and a coordinate of the center of light axis for performing the magnification or reduction in said first resolution conversion in accordance with said detected output; and
converting a signal on which said first resolution conversion is performed into a video signal by a second camera signal processing,
wherein said image pickup unit is provided with a primary color filter including a color separating unit of arbitrary three colors or more that is provided corresponding to each pixel, further comprising steps of:
storing chromatic aberration data specific to said image pick-up lens in a data memory unit for each color of said primary color filter, and
computing a control parameter for controlling said conversion factor and coordinate of the center of light aixis for performing the magnification or reduction in said control unit, using said chromatic aberration data stored in said data memory unit and the detected output from said detection unit.

20. The method of correcting the chromatic aberration of the lens according to claim 19, further comprising steps of:
performing display system processing to output the video signal on which said second camera signal processing is performed to a display apparatus or to an external output terminal, and/or
recording the video signal on which said second camera signal processing is performed in a recording medium.

21. The method of correcting the chromatic aberration of the lens according to claim 20, further comprising steps of:
inversely converting a video signal reproduced from said recording medium into a primary color signal, wherein
said first resolution conversion is performed with respect to said inversely converted signal.

22. The method of correcting the chromatic aberration of the lens according to claim 19, further comprising a step of:
performing a second resolution conversion with respect to the video signal, on which said second camera signal processing is performed, to perform a magnification or reduction of the whole screen.

23. The method of correcting the chromatic aberration of the lens according to claim 22, wherein
said first and second resolution conversion is performed by switching a signal supplied to a single block.

24. The method of correcting the chromatic aberration of the lens according to claim 19, wherein
a difference between a coordinate of a detected pixel on a screen and the coordinate of the center of light axis is used for the detection of said lens image height of the subject.

25. The method of correcting the chromatic aberration of the lens according to claim 19, further comprising steps of:
adjusting focus to control a focusing position, and
representing said detecting pixels of the whole screen, with a coordinate of said controlled focusing position, to be used for the detection of said lens image height of the subject.

26. The method of correcting the chromatic aberration of the lens according to claim 19, further comprising steps of:
further detecting a drive state and an amount of camera shake correction of said image pick-up lens, and
controlling the conversion factor for performing the magnification or reduction in said resolution conversion unit and said coordinate of the center of light axis for performing the magnification or reduction in said resolution conversion unit, in accordance with said further detected output in addition to said detected output.

27. The method of correcting the chromatic aberration of the lens according to claim 19, wherein
information corresponding to said drive state of the iris diaphragm and lens image height of the subject can be input manually.

* * * * *